H. L. PITMAN.
COMBINED TYPE WRITING AND COMPUTING MACHINE.
APPLICATION FILED APR. 28, 1915.
1,308,506.
Patented July 1, 1919.
9 SHEETS—SHEET 1.
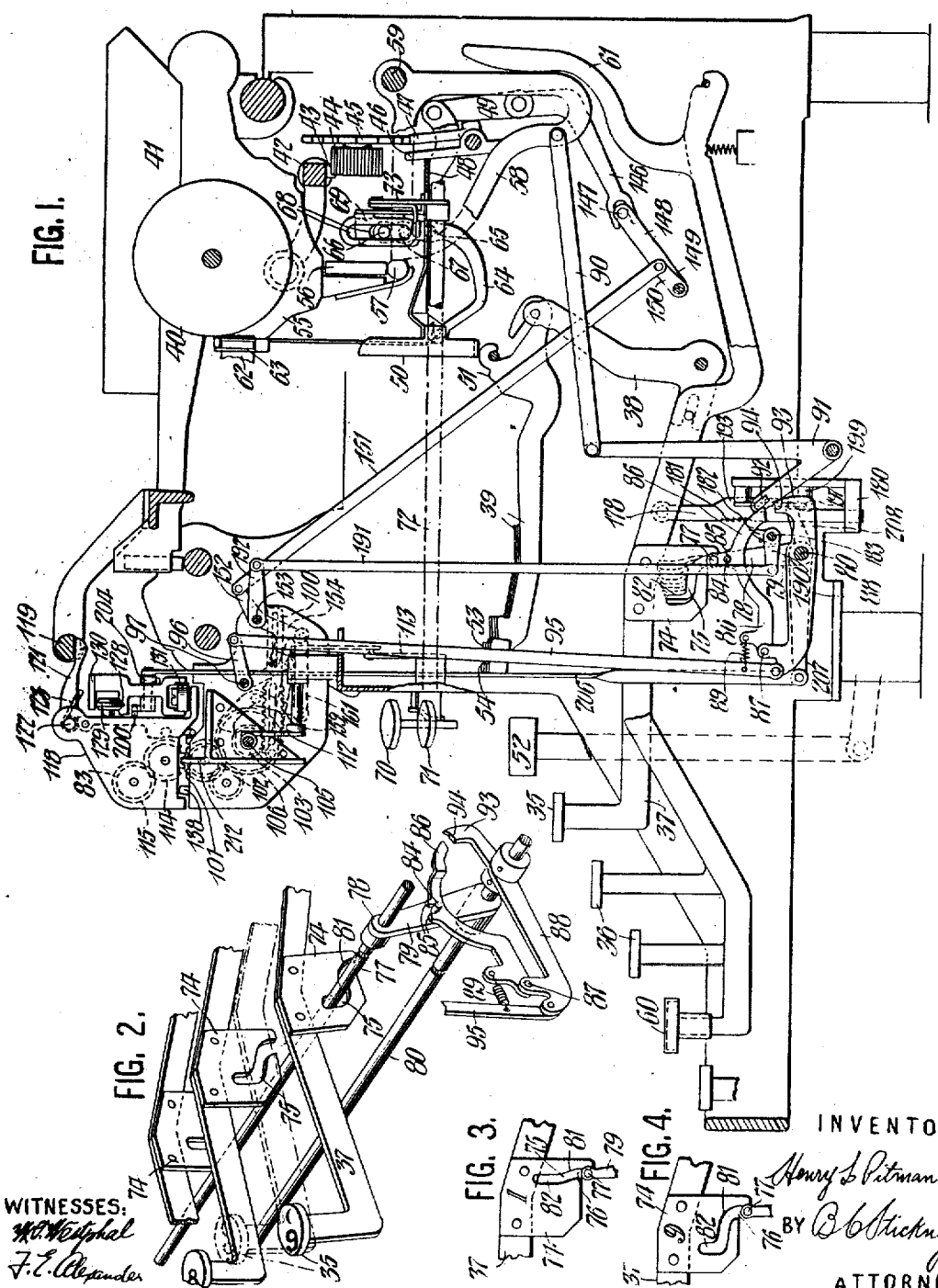

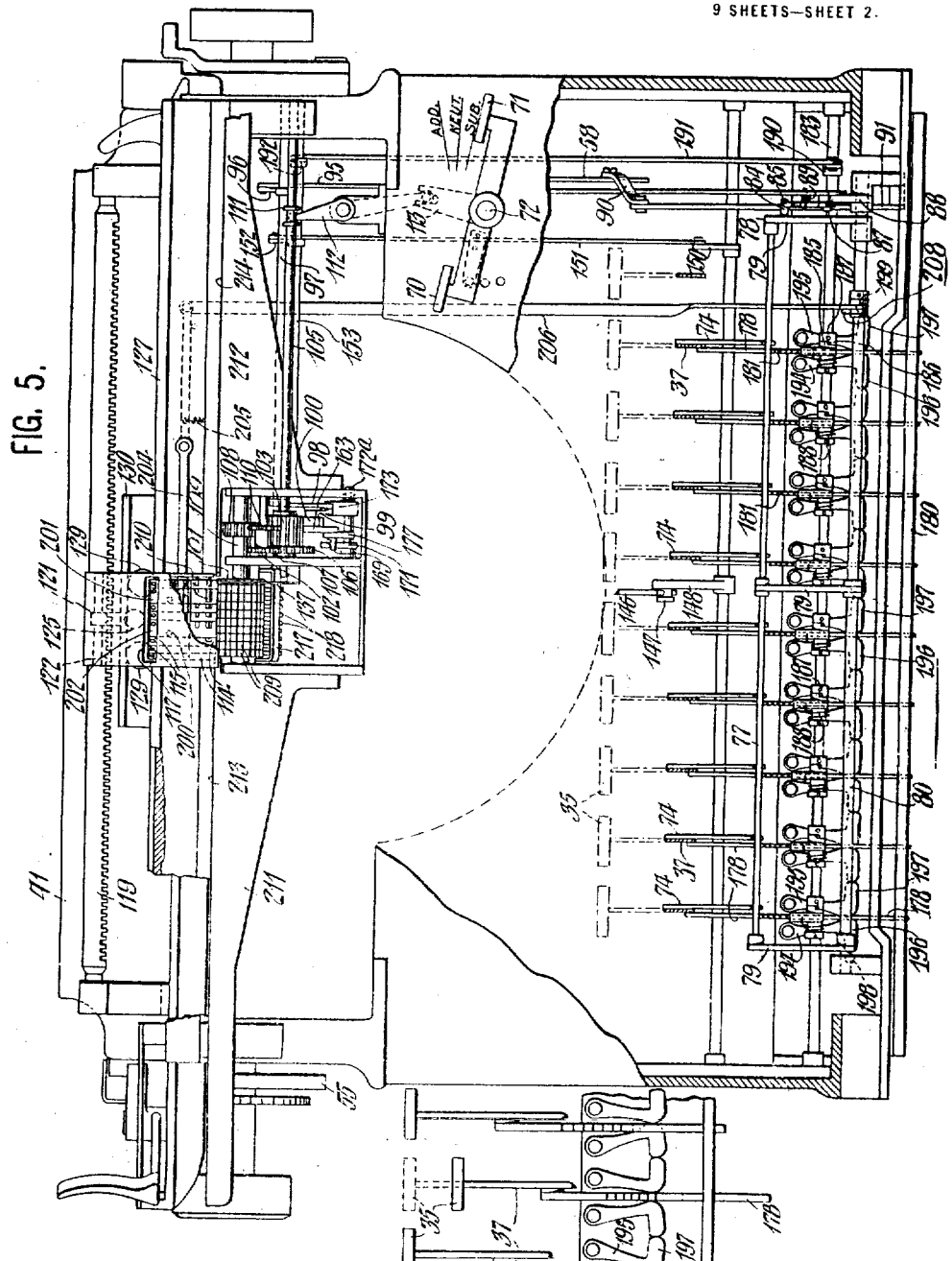

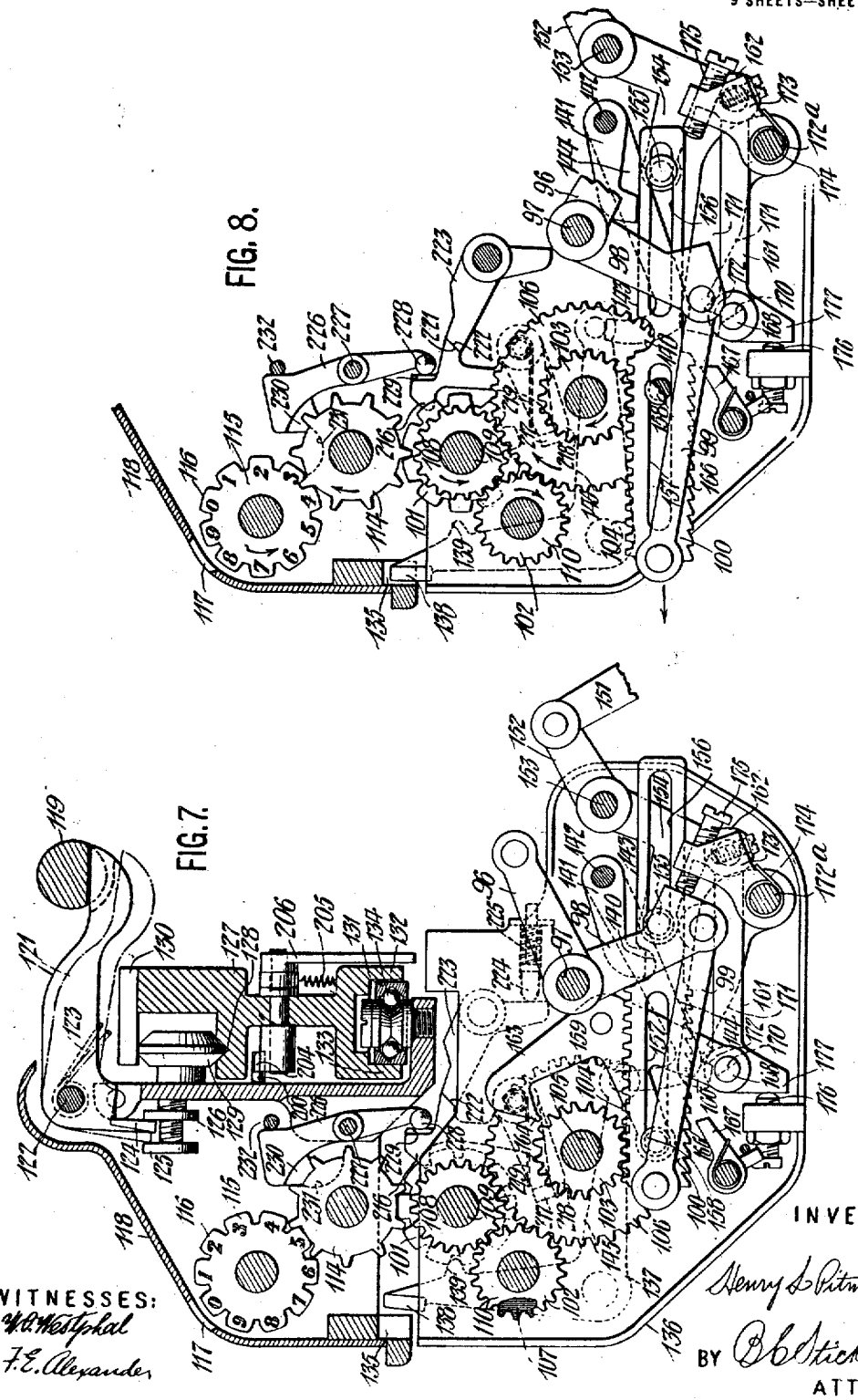

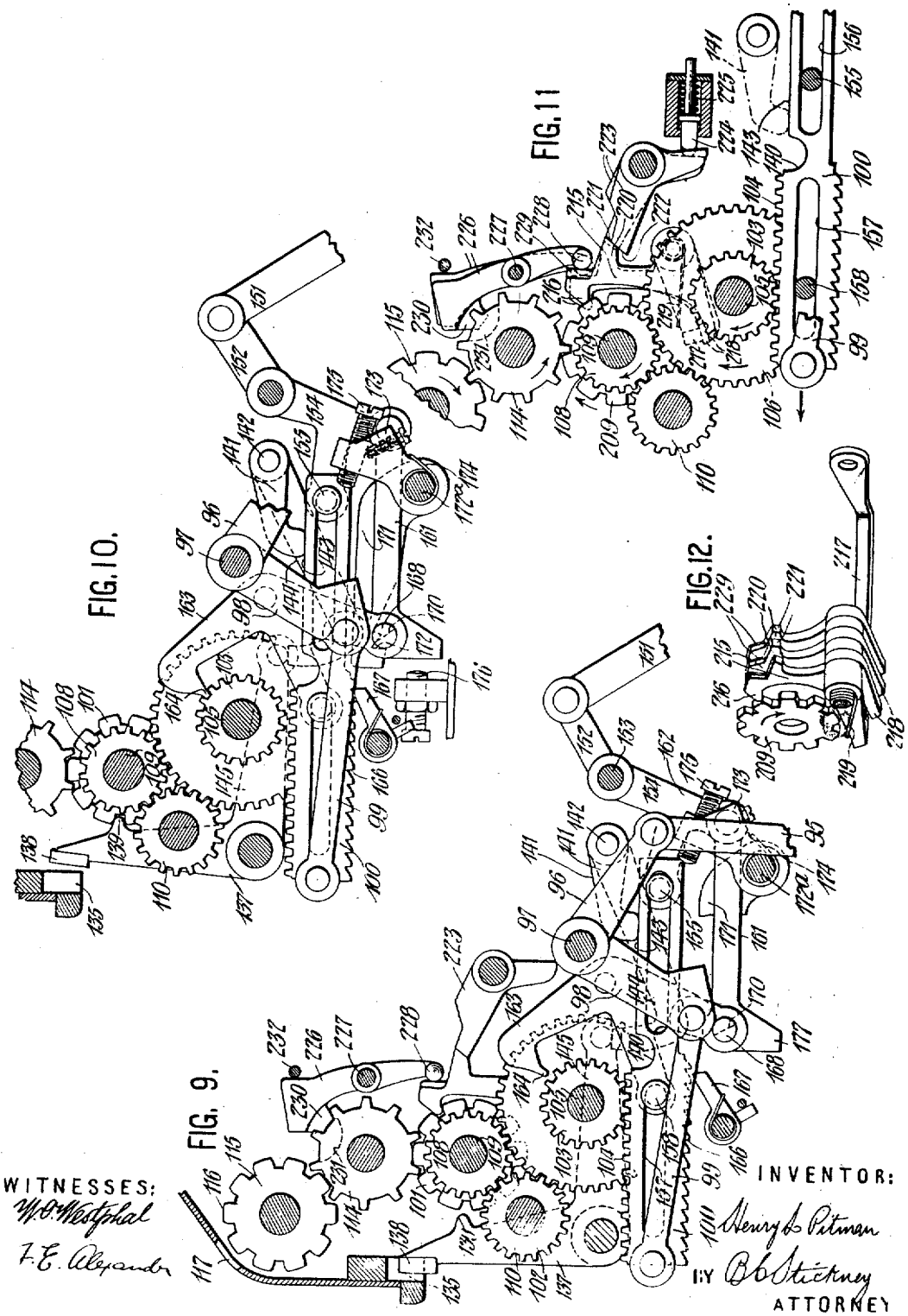

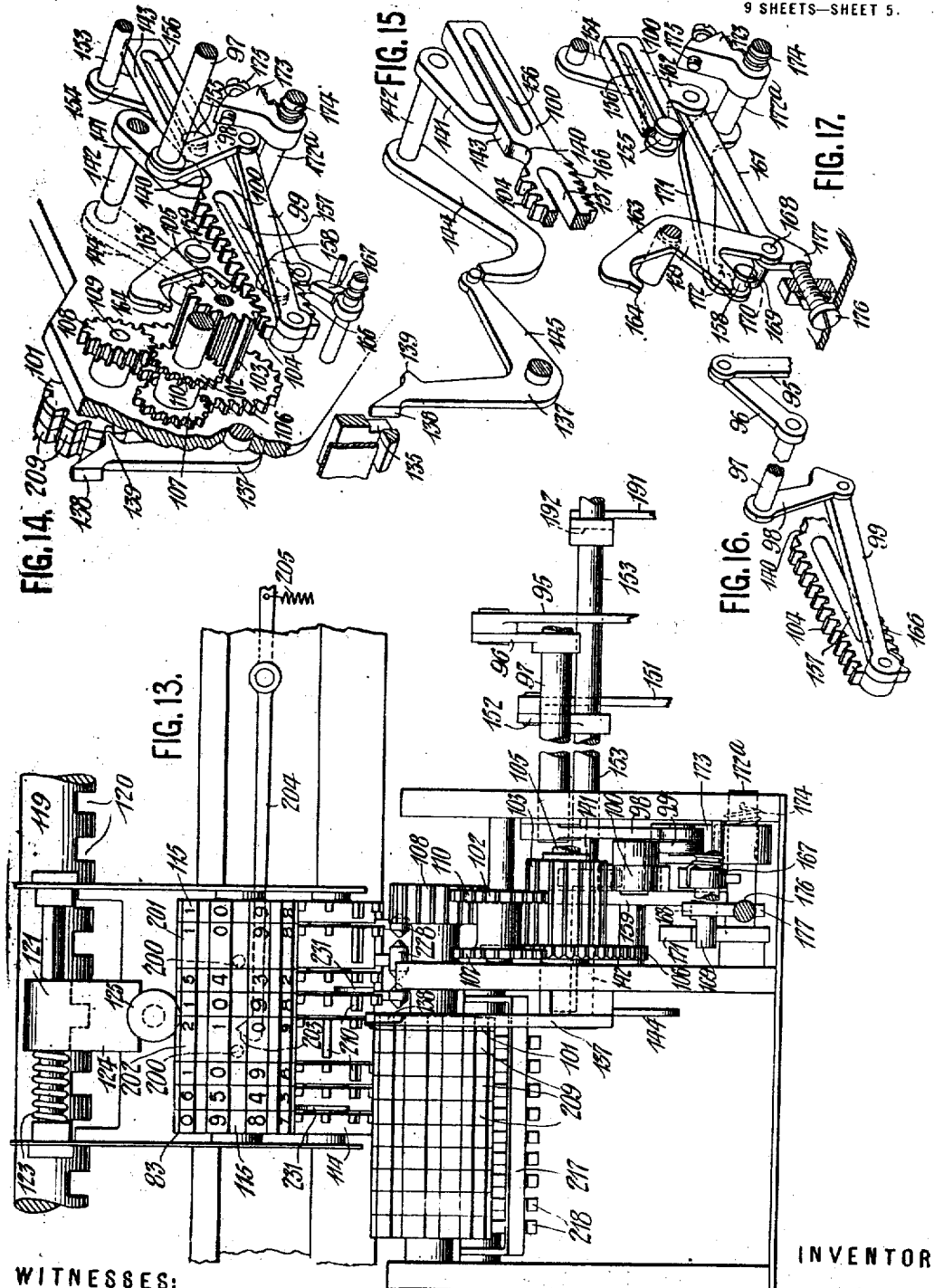

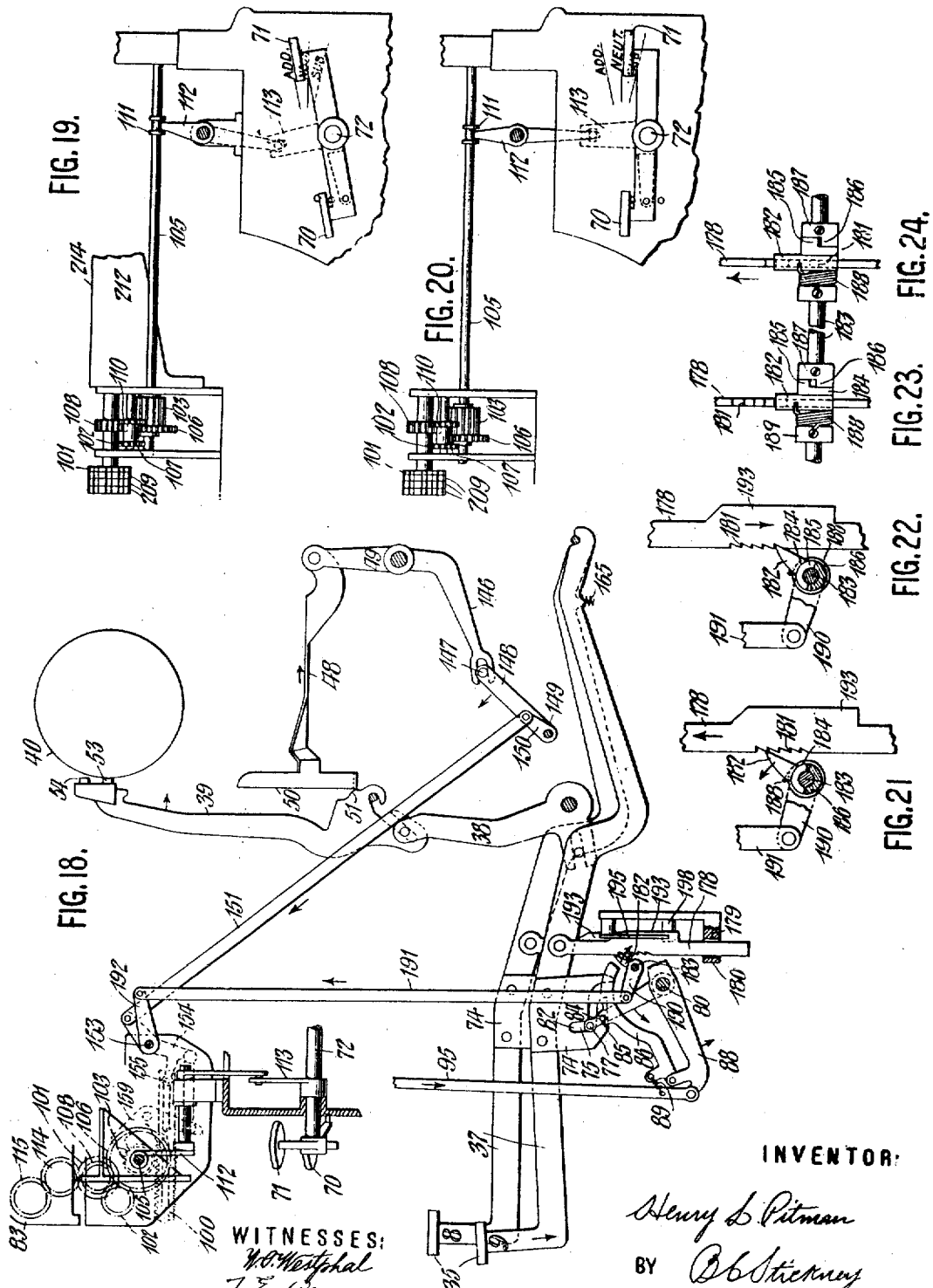

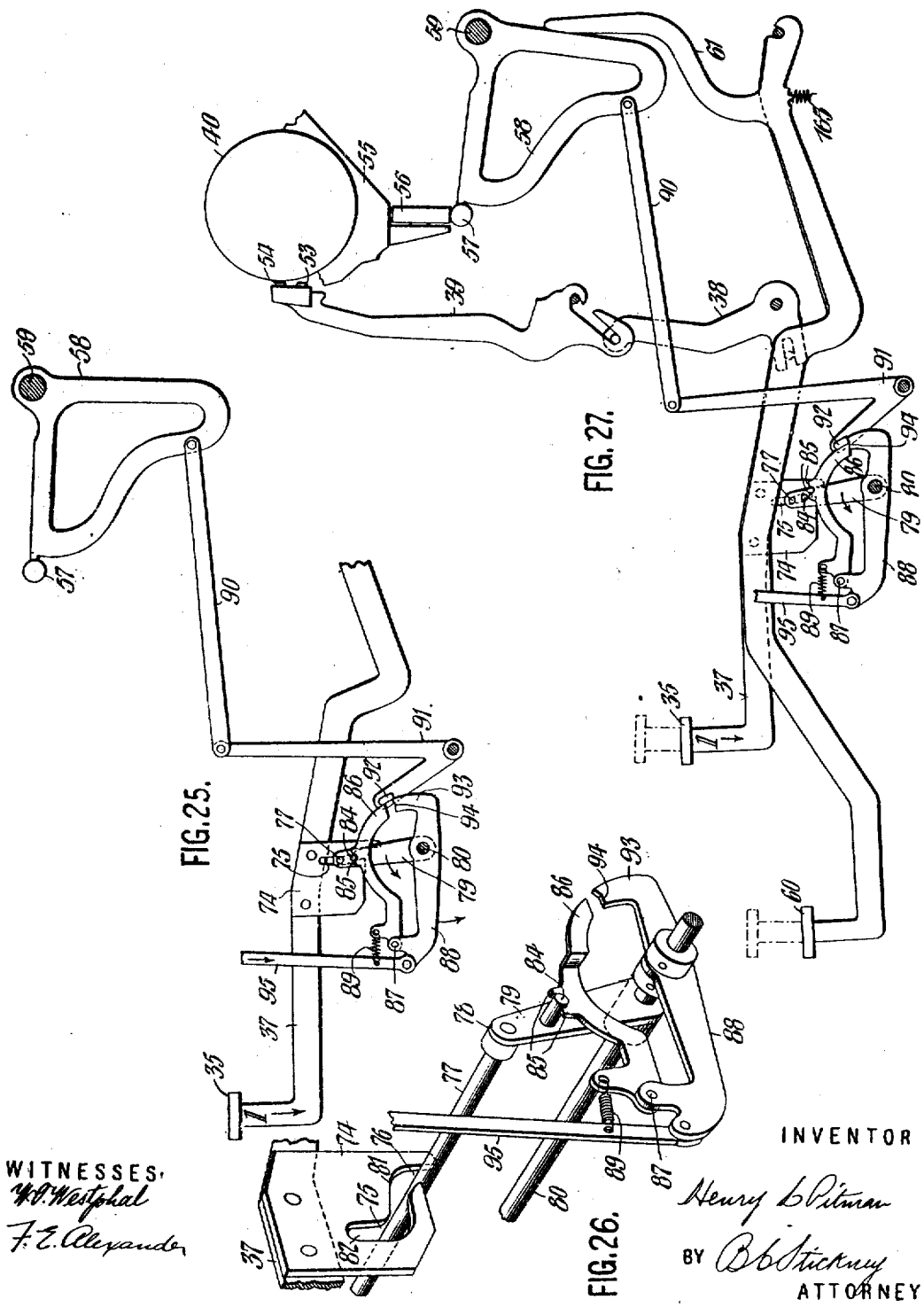

H. L. PITMAN.
COMBINED TYPE WRITING AND COMPUTING MACHINE.
APPLICATION FILED APR. 28, 1915.
1,308,506.
Patented July 1, 1919.
9 SHEETS—SHEET 8.
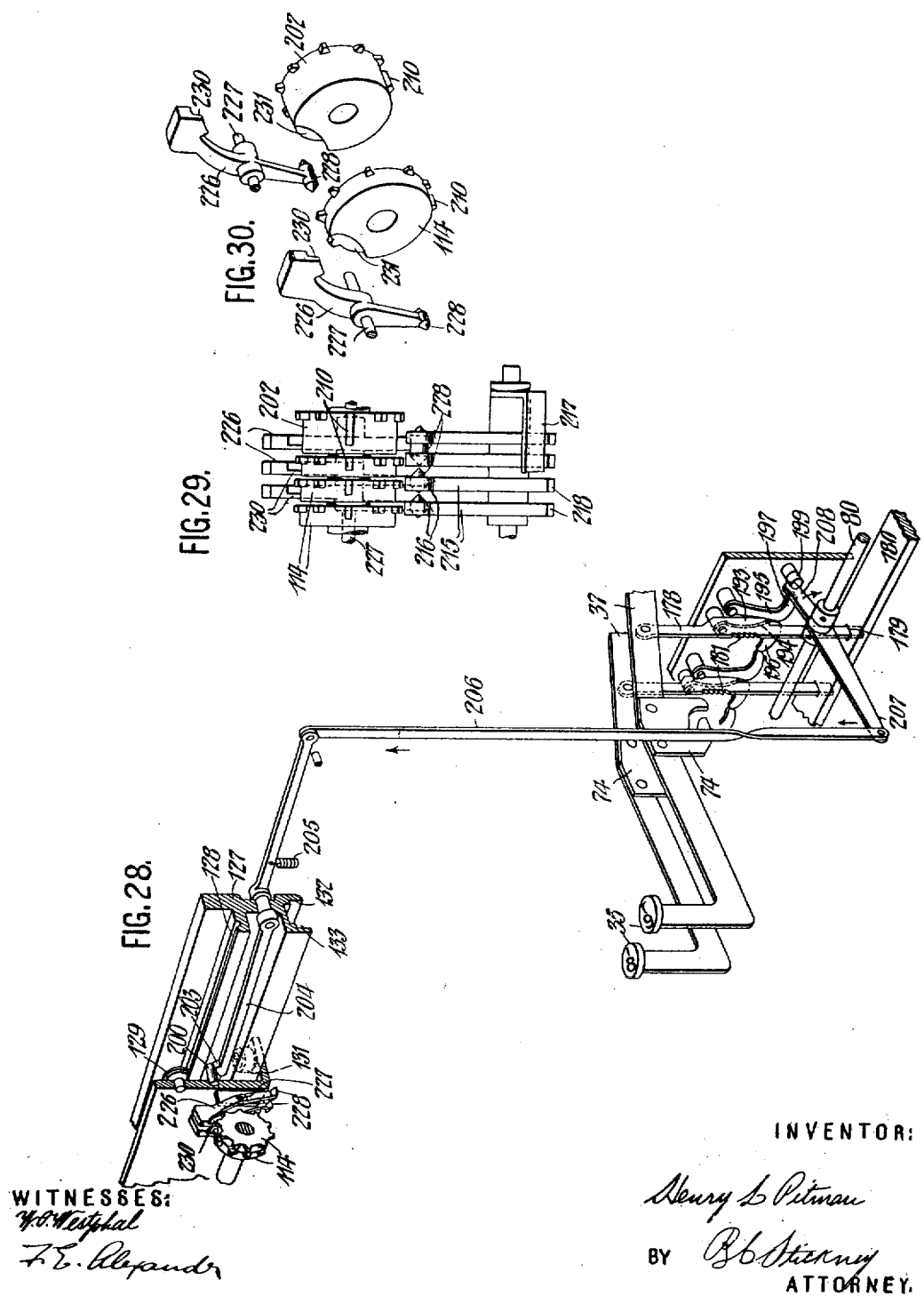

H. L. PITMAN.
COMBINED TYPE WRITING AND COMPUTING MACHINE.
APPLICATION FILED APR. 28, 1915.

1,308,506.

Patented July 1, 1919.
9 SHEETS—SHEET 9.

WITNESSES:
Y. O. Westphal
F. E. Alexander

INVENTOR:
Henry L. Pitman
BY
B. C. Stickney
ATTORNEY.

UNITED STATES PATENT OFFICE.

HENRY L. PITMAN, OF EAST ORANGE, NEW JERSEY, ASSIGNOR TO UNDERWOOD COMPUTING MACHINE COMPANY, OF NEW YORK, N. Y., A CORPORATION OF NEW YORK.

COMBINED TYPE-WRITING AND COMPUTING MACHINE.

1,308,506.  Specification of Letters Patent.  Patented July 1, 1919.

Application filed April 28, 1915. Serial No. 24,390.

*To all whom it may concern:*

Be it known that I, HENRY L. PITMAN, a citizen of the United States, residing in East Orange, in the county of Essex and State of New Jersey, have invented certain new and useful Improvements in Combined Type-Writing and Computing Machines, of which the following is a specification.

This invention relates to a combined typewriting and computing machine of the key-driven type. Generally speaking, the computing mechanism is of the master-wheel type, a change drive being provided through the gearing directly driving the master wheel, so that the latter may be rotated in either direction for addition or subtraction, or can be, in effect, disconnected from the driving mechanism in case it is not desired to compute.

The train of gearing to the master wheel may be actuated by a rack bar, which on its initial and active stroke is in engagement with the driving train, but at the end of such stroke is moved out so that it can return idly relatively to such driving train. The rack bar in turn may be driven from the numeral keys through the intermediary of an indexing mechanism, including a plurality of differential elements, one for each numeral key, which have cam surfaces forming slots arranged to engage and drive an oscillator universal to all numeral keys and to all differential elements. The sides of the slots in the differential elements may positively cause the movement of the oscillator, which in turn is connected to positively cause the back-and-forth movement of the driving rack bar.

To avoid computing when writing in upper-case characters, the case-shift frame may be connected to interrupt the train of linkages between the oscillator and the driving rack bar. A single universal full-stroke mechanism may be provided for the rack bar to insure the full return of the same before the next numeral key is actuated. This mechanism may coöperate with a locking mechanism for the numeral keys, which enforces the full return of the depressed numeral key before the same or any other numeral key can be depressed. Thus, the present invention provides means whereby much of the usual full-stroke mechanism may be simplified.

It has been found advantageous in the present invention to time- or control part of the computing mechanism by the usual universal bar of an Underwood typewriting machine, which only comes into action near the end of a key stroke. By making this universal bar bodily remove the above-mentioned rack bar clear of the computing driving gears, it makes it impossible for the master wheel to be turning while the typewriter escapement is feeding the typewriter; yet, at the same time a sufficient part of the typewriter key stroke is reserved for the computing operation. In the present invention it has been found advantageous to provide a detent for the master wheel which automatically both locks and alines it whenever said rack bar is made ineffective by moving it clear of the other gears. This makes it certain that the master wheel has its teeth in the proper position whenever the carriage feeds. A latch may insure that the rack cannot return to meshing position until it has arrived where it will assume its normal position of rest, thus insuring that when meshing takes place all parts will assume proper positions.

The full-return key device, mentioned above, may be also controlled by said rack bar and the typewriter escapement mechanism, thus compelling said device to be effective whenever advantageous, but at the same time making it possible to eliminate any unnecessary interference with the operation of the numeral keys.

The numeral key locking device may include a device for preventing the simultaneous operation of keys, and this device may be utilized for locking the keys at the pointing off places in computations. This same device may be further utilized for preventing the operation of the numeral keys when matter is written which should not involve any operation of the computing devices. For this purpose, a bichrome ribbon device analogous to the ordinary device may be utilized with the added advantage that said bichrome device may determine whether addition or subtraction is to be performed. Thus, added digits and matter not computed may be written in black while all subtraction may be entered in red.

These devices for preventing a simultaneous operation of keys make it impossible to tie up the machine by depressing two numeral keys at once by jamming the oscillator into two cam slots at once.

Other features and advantages will hereinafter appear.

In the accompanying drawings,

Figure 1 is a vertical skeleton section taken from front to rear, showing, in a general way, the combined typewriting and computing mechanism.

Fig. 2 is a skeleton perspective view, showing the numeral keys and the mechanism which may operate, the "9" key being partially depressed in the act of effecting a combined typewriting and computing operation.

Fig. 3 is a fragmentary side view of the "1" numeral key lever with its differential cam slot for effecting a driving action of the computing mechanism corresponding to the value of the key.

Fig. 4 is a fragmentary view similar to Fig. 3, except that it is for the "9" key, the extreme variation in the valuating cam slots being evident by comparison of the same with that of Fig. 3.

Fig. 5 is a fragmentary view in front elevation, with parts omitted for simplicity, and parts broken away to show the underlying structure, the computing mechanism being shown as adjusted to subtract.

Fig. 6 is a fragmentary detail view of the locking mechanism for preventing the depression of more than one numeral key at a time. One of the keys is shown in dotted lines in its normal raised position, and in full lines in its depressed or actuated position, in which latter position it will be seen that it crowds the locking interferants together so that no other numeral key can be depressed.

Fig. 7 is a vertical section from front to rear through a computing head or totalizer, and showing the parts thereof in a position at rest with the "0" of the dial wheel exhibited opposite the sight opening. The means for connecting the totalizer to travel with the carriage is shown in full lines in its connected position, and in dotted lines in its disconnected position.

Fig. 8 is a fragmentary sectional view similar to Fig. 7, except that a numeral key has been actuated, and the various parts are shown in the positions which they will occupy, with the numeral key proceeding on its down stroke near the end thereof.

Fig. 9 is a view similar to Figs. 7 and 8 after the key has reached the limit of its down stroke and the master wheel has been locked against overthrow and the driving rack bar is about to be disconnected from driving relation with its pinion for the return stroke.

Fig. 10 shows a part of the structure of Figs. 7 to 9 in a slightly further advanced position, where the totalizer has been disconnected so that it may advance to the next letter-space with the typewriter carriage and with the driving rack bar withdrawn from engagement with the pinion which it drives so that it can return idly.

Fig. 11 is a detail of the driving mechanism for the totalizer or computing head and the carry-over train, showing how a carry-over may be effected, and the detents which are normally in action released by the coming of the "0" on the dial wheel to the sight opening.

Fig. 12 is a fragmentary skeleton perspective view of the carry-over detents, showing how a single spring dominates all of them, which spring is of sufficient strength to justify the carry-over wheels, and yet only one being necessary for the whole group of carry-over wheels.

Fig. 13 is a view in front elevation of the totalizer or computing head, showing the carry-over mechanism and the change drive for the master-wheel mechanism.

Fig. 14 is a skeleton perspective view of the change-drive gearing to the master-wheel.

Fig. 15 is a skeleton perspective view of the lock for the totalizer which prevents the travel thereof while the master wheel is being driven.

Fig. 16 is a skeleton perspective view of the portion of the driving rack for the train of gearing to the master wheel.

Fig. 17 is a skeleton perspective view of the mechanism for shifting the driving rack to the train of gearing for the master wheel out of mesh with the intermediate barrel gear which it drives, the motion being a parallel-link motion, with provision for locking the rack in its disengaged position until it has completely returned to its home position.

Fig. 18 is a skeleton section taken from front to rear of the machine, showing the "9" key as having been actuated to print and to run up a computation.

Fig. 19 is a detail of the state-controlling mechanism showing how the change gear connection of the drive to the master wheel is shifted from the bichrome ribbon shift, to give any one of three states, to wit, adding, neutral, and subtraction. The mechanism in this figure is adjusted for addition.

Fig. 20 is a view similar to Fig. 19, except that the mechanism is adjusted for neutral or non-adding.

Figs. 21 to 24 are detail views showing means for preventing a too-quick repeated action of the same numeral key or another numeral key before the parts have returned to their normal positions after the initiation of a computation. Fig. 21 shows how this mechanism permits the return of the actuated numeral key, while Fig. 22 shows how this mechanism prevents a premature down stroke of a numeral key.

Fig. 25 shows a detail of the connection of the "1" key to the computing mechanism which it drives, and how it is dominated from the case-shift frame, so that when writing upper-case characters, the computing mechanism may be silenced. In this view, however, the machine is adjusted for writing lower-case characters and the computing connection is not silenced.

Fig. 26 is a skeleton perspective view of the silenceable connection between the numeral keys and the computing mechanism, the "9" key-lever being shown in this instance. The mechanism in this view is also in its unsilenced condition.

Fig. 27 is a skeleton section from front to rear, and showing parts illustrated in Figs. 25 and 26, except that the case-shift frame is adjusted for writing upper-case characters and the computing connection is silenced, so that although the "1" numeral key is depressed, no computation will be effected.

Fig. 28 is a skeleton perspective view showing how the locking means for the numeral keys is brought into play where a punctuation mark, such as a comma or a decimal point, should be written in a group of figures, whereby no numeral key can be actuated at such a time.

Fig. 29 is a detail view of the group of computing wheels and the detent means therefor, illustrating also the increased width of a computing wheel for a punctuation space.

Fig. 30 is a spread-apart perspective view of the parts shown in Fig. 29.

Fig. 31 is a skeleton line and diagrammatic view of the control for the state or character of computation of the computing mechanism from the bichrome shift.

Fig. 32 is a diagrammatic skeleton line view, showing the various computing connections from the numeral key to a computing head and coöperating mechanism.

Numeral keys 35 and character keys 36 depress key-levers 37, to rock bell cranks 38, to swing type bars 39 up rearwardly against the front side of a platen 40 mounted to rotate on a carriage 41. The carriage 41 travels step by step at the striking of the keys, under the control of an escapement mechanism indicated in general at 42, and including a rack bar 43, pivotally mounted on the carriage 41, and engaging a pinion 44 connected for movement with an escapement wheel 45, which is controlled by a pair of dogs 46 and 47, one of which is fixed and the other of which is movable. The dogs 46 and 47 are actuated by a universal frame 48, supported for back-and forth reciprocation on a swinging frame 49, and provided with a universal bar 50, which lies in the path of heels 51 provided on the type bars 39, so that when any of the latter come up to strike the work-sheet on the platen 40, the universal frame 48 will be oscillated to permit a step movement of the carriage 41 under the control of the escapement wheel 45. Jump movements of the carriage 41 may also be obtained in addition to the step-by-step movements, by means of any suitable tabulating mechanism, such as that indicated, by a tabulating key 52.

The type bars 39 for the numeral keys 35, as well as the character keys 36, are provided with two sets of characters 53 and 54, so that they each control selectively the writing of two different characters. In the case of the numeral keys, the digits or numbers are usually written by the lower-case type 53, while some other characters are written by the upper-case type 54. To effect the change from writing normally lower-case characters to writing upper-case characters, the platen 40 is mounted to be shifted from a lower-case position to an upper-case position. For this purpose, it is mounted in an inner carriage 55, shiftably mounted in the main carriage 41. The inner carriage 55 is provided with one or more rollers 56, resting on the shift rail 57 of a shift frame 58 pivoted to rock about the axis of a shaft 59. The shift frame 58 may be rocked for upper-case printing by one or more shift keys 60, which may be of the temporary and semi-permanent type such as is usually found in the Underwood typewriting machine. The levers of the keys 60 are each provided with an arm 61, which extends up into engagement with one of the arms of the shift frame 58, so as to engage the same and rock the rail 57 upwardly, and thus bring the line of print of the platen 40 opposite the upper-case type 54 on the type bars 39 when the latter are swung to their printing position.

The type 53, 54 print indirectly on the work-sheet carried by the platen 40 through an ink ribbon 62 threaded through a guide 63. The ink ribbon 62 is preferably of two colors, for instance red and black, and known as a bichrome ribbon. At each stroke of a key, the guide 63 is moved to interpose the ribbon 62 between the type and the work-sheet on the platen—which portion of the ribbon, whether red or black, is interposed depends on the exigencies of the moment as selected by the operative. The guide 63 is actuated by a vibrator 64 pivoted at 65. This mechanism is of the well-known Underwood type more fully described in Patent 926,050, granted to Frank A. Cook, June 22, 1909.

The vibrator 64 includes a pair of pins 66, 67, at different radial distances from the pivot 65, and arranged to be engaged selectively by spaced ears 68, so as to determine the extent of rocking of the vibrator 64 at each key action. The ears 68 are mounted on a slide 69, which is transversely adjustable on the universal frame 48, so that it will move back and forth with the frame at the actuation of each key. The transverse shifting of the slide 69 is effected manually by means of a pair of balanced keys 70, 71, secured to a shaft 72, which is provided with an arm 73 connected to the slide 69. The adjustment of the slide 69 determines which of the ears 68 shall engage one of the pins 66, 67, and thus the extent of throw of the ribbon 62, and thereby determines in what color the printing shall be. In the position of the double key-lever 70, 71 shown in Fig. 5, the printing will be in red, while in the position shown in Figs. 19 and 20, the printing will be in black.

The typewriting mechanism thus far considered is well known in the Underwood typewriting machine, and in itself forms no part of the present invention, but combines and coöperates with the computing mechanism which will now be described, to form a combined typewriting and computing machine giving concomitant computing and typewriting actions for the same numbers by the striking of a single set of numeral keys.

In the present exemplification of the machine, the computing mechanism is key-driven, that is, the numeral keys furnish the actual power which operates the various parts of the computing mechanism.

The valuating or indexing mechanism for determining the extents of computing actions to accord with the digital values of the numeral keys as actuated, is connected, at least in part directly to the numeral keys. For this purpose, there is provided on each of the numeral-key-levers 37 from "1" to "9," a differentiator 74. The differentiators are each shown in the form of a plate attached to the key-lever, and having a cam slot 75 open at its lower end, as at 76. The open ends 76 are all in alinement with each other, and, generally speaking, in register with a rail 77 universal to all of the diffentiators 74. The rail 77 forms the crosspiece of a bail 78, having arms 79 mounted on a rock shaft 80. The bail 78 may be considered a part of the valuating or indexing mechanism, and inasmuch as it is oscillated varying amounts at the striking of the several numeral keys according to which numeral key is actuated at any particular time, it may be termed an oscillator.

To obtain the variations in the movements of the oscillator 78, the cam slots 75 are of different conformation and have different curvatures. For example, by reference to Figs. 1 to 4, it will be seen that the right-hand and upper edge of each cam slot 75 is bordered by a cam edge 81, which extends from the open end of the slot toward the left an amount dependent upon the value of the associated numeral key 35. For example, for the "1" key (Fig. 3), the inclination is slight, while for the "9" key (Fig. 4), the inclination is quite great. The extent of inclination between the "1" key and the "9" key is graded step by step in an increasing manner and by a fixed increment, so that the bail 78 will be shifted increasing amounts, if the numeral keys are successively operated starting with the "1" key and proceeding to the "9" key. The slots 75 are provided with a dwell or idle portion 82, which permits a certain amount of idle movement of the numeral keys 35 after the computing drive thereby has been finished. It will be noted in passing that although the cam edge 81 for the "9" and other high numbered differentiators is seemingly abrupt toward the finish of its action, nevertheless the same will operate very easily and smoothly, because of the fact that by this time the rail 77 will have moved considerably to the left of its starting position almost directly above the axis of the pivot shaft 80.

The oscillator 78 forms one element in a driving train to one or more totalizers or computing heads 83, so that numbers may be run into the computing heads as they are printed at the actuation of the numeral keys 35. It is not always necessary, however, to compute when writing with numeral keys, and for this purpose the connection from the oscillator to the totalizer has been made interruptible, whereby the computing action of the numeral keys may be silenced. The connection from the oscillator 78 includes a pin 84 on one of the arms 79 thereof, which, when located between a pair of horns or projections 85 on a humpbacked interponent 86, will drive the latter to effect a computing operation. The humpbacked lever 86 is pivoted at 87 to a lever 88 mounted on the shaft 80. The oscillator 78 and the lever 88 are not connected, however, directly by the shaft 80, but are connected for driving movement through the lever 86. Normally a spring 89 holds the humpbacked lever 86 in its raised position, so that the horns 85 straddle the pin 84, forming a positive connection between the lever 86 and the oscillator 78.

When, however, it is desired not to compute, for example, when writing upper-case characters with the numeral keys 35, the lever 86, which is in reality an interponent, can be depressed against the tension of the spring 89, to a disconnected and silent position. To do this, the shift frame 58 is connected by a link 90 to a bell crank 91 having a finger 92 overlying one end of the interponent lever 86. When the shift frame 58 is rocked to permit the writing of upper-case characters, the finger 92 will depress the interponent lever 86, so that the horns 85 will clear the pin 84, thereby disconnecting the oscillator, and hence the numeral keys, from the totalizer and other computing mechanism operated by the lever 88. The downward movement of the lever 86 and the finger 92 is limited by an arm 93 of the lever 88, formed with a cornered seat 94 to coöperate with both the end of the lever 86 and the finger 92.

When the interponent lever 86 straddles the pin 84 with its horns 85, then the movements of the oscillator 78 are transmitted to the lever 88, to transfer these movements to the actuating mechanism of the computing head or totalizer 83. The lever 88 is pivotally connected to a link 95, which is arranged to oscillate an arm 96 secured to a rock shaft 97 (Figs. 7 to 14). Connected to rock with the shaft 97, is a second arm 98, which is connected by a link 99, to the forward end of a driving rack bar 100 which forms a part of the actuating mechanism.

The rack bar 100 is adapted to drive a master wheel 101 through a change-gear train 102. This change-gear train includes a pinion 103 to mesh with rack teeth 104 provided on the rack bar 100. The pinion 103 (Figs. 13 and 14) is a barrel gear having teeth of considerable width, so as to slide transversely of the rack bar 100, and yet be capable of meshing therewith in all of these positions. The gear 103 is secured to a shaft 105, to which is also secured a gear 106. This latter gear 106 may mesh alternatively with a gear 107 or with a gear 108 secured to the master wheel shaft 109. If the gear 106 meshes directly with the gear 108, it will drive the master wheel in one direction. If, however, it meshes with the gear 107, it will drive the master wheel in the opposite direction through an intermediate gear 110 secured for rotation with the gear 107 and meshing with the gear 108 on the master wheel shaft 109.

The direction of rotation of the master wheel 101 will determine whether the computation will be adding or subtracting. To obtain the change in driving relation between the actuated rack bar 100 and the master wheel 101, the barrel gear 103 and the large gear 106 are moved together as a unit, the barrel gear 103 maintaining its teeth always ready to be meshed with the rack 104, while the gear 106 shifts from engagement with the gear 107 to engagement with the gear 108, or to an intermediate position. To obtain this shifting in the gears 103 and 106, to change the direction of drive, or to control the drive of the master wheel, the shaft 105 on which they are secured, is mounted for sliding movement in the direction of its length (Figs. 19 and 20). To shift the shaft 105, and with it the gears 103 and 106, a collar 111 is provided on the shaft to be engaged by a lever 112, which in turn is rocked by an arm 113 secured to the shaft 72 of the bichrome shift mechanism. If adding is desired, with printing in black, the double key lever 70, 71 is operated to bring it into the position shown in Fig. 19, when the gears 103 and 106 are shifted to the extreme right of their position with the gear 106 in mesh with the gear 108. If non-adding is desired, with printing still in black, the double key lever 70, 71 is adjusted to its Fig. 20 position, when the gear 106 will be located intermediate the planes of the gears 107 and 108, so that it will drive neither of them. If, again, it is desired to subtract, with the printing in red, the double key lever 70, 71 is manipulated to its Fig. 5 position, when the gears 103, 106 will be shifted to the extreme left, bringing the gear 106 into mesh with the gear 107, so that the latter will drive indirectly through the gear 110, the gear 108 and thus the master wheel, in the opposite direction.

The master wheel 101 is adapted to drive the computing wheels of the totalizer 83 seriatim. The computing wheels of the totalizer are arranged in pairs in the same plane, including secondary computing wheels 114 arranged to mesh directly with the master wheel, and primary computing wheels 115 having numbers on their peripheries so as to be in the form of dial wheels, meshing with the computing wheels 114. The dial wheels 115 have large block-shaped teeth 116, with the numbers on the block faces of the teeth arranged to be brought into view at a sight opening 117 provided in the totalizer or computing head casing 118. Inasmuch as the teeth of the dial wheels 115 are block-shaped to accommodate the numbers on the peripheries thereof, the teeth of the computing wheels 114 must be widespread to mesh properly therewith, and hence the master wheel 101, which drives the computing wheels 114, must have its teeth block-shaped to mesh properly with the computing wheels 114.

To obtain the relative traveling movement between the master wheel 101 and the computing wheels of the totalizer 83, the latter is made to travel by connecting it with the carriage 41. For this purpose, there is provided on the front of the carriage 41, a rail 119 having on its under surface a series of slots 120 located at letter-space intervals, and forming teeth therebetween.

Mounted on the casing or frame 118 of the totalizer 83, there is provided a latch 121, which is pivoted at 122, and normally urged by a spring 123, so as to bring one end thereof into one of the slots 120 provided in the rail 119. The intrusion of the latch 121 in one of the slots 120 will lock the totalizer to the carriage 41, so that it will travel therewith as the latter moves step by step at the striking of the numeral keys. This, then, will bring the computing wheels successively into register with the master wheel, so that the digits corresponding to the numeral keys actuated, can be run into the computing wheels and exhibited by the dial wheels 115 through the sight opening 117.

If it is desired to change the position of the totalizer relative to the carriage, so as to alter the position of the computing zone, the latch 121 may be depressed against the tension of its spring 123, and the totalizer carriage slid sidewise relatively to the typewriter carriage. The movement of the latch 121 may be adjustably limited by a finger 124 thereon extending between a pair of adjustable stop nuts 125 and 126 provided on the casing or carriage of the totalizer. To support the totalizer in its movement, there is provided on the frame of the typewriting machine, a rail 127 having a track 128 in which runs a pair of ridge rollers 129, which are prevented from jumping off the rail 127 by means of a guard 130. To prevent in-and-out rocking of the totalizer, there are provided rollers 131 rotating about a vertical axis and traveling between tracks 132 and 133 provided by an opening in the bottom of the rail 127. The rollers may be provided with ball bearings 134, so as to make the same smooth riding.

In order to avoid any possibility of a relative movement between the computing wheels and the master wheel when the latter is rotated to effect a driving action, as when running a computation into the computing wheels, the totalizer carriage is locked against movement. For this purpose, the totalizer carriage is provided with a rack 135, with spaces between the teeth at letter-space intervals.

On the frame 136 which supports the actuating mechanism for the totalizer, there is provided a bell crank 137 having a dog 138 arranged to engage between the teeth of the rack 135. The bell crank 137 is also provided with a locking tooth 139, which normally engages between the teeth of the master wheel 101 to prevent rotation thereof. When, however, a numeral key is actuated and the driving action of the master wheel is to be started, the bell crank 137 will be rocked to remove the locking tooth 139 from engagement with the master wheel 101, and to bring the dog 138 into engagement with the rack 135, thus having a concomitant unlocking of the master wheel and a locking against traveling movement of the totalizer.

To rock the bell crank 137 at this time, there is provided in the rack bar 100, which forms one of the main driving members, a cam depression or socket 140, in which normally rests the hook end of an arm 141 secured to a shaft 142. When the rack bar 100 starts forward in its driving movement, the cam surface of the socket 140 will force the arm 141 out on to the dwell portion 143 of the rack bar 100, thereby rocking the shaft 142. The shaft 142 has secured therewith for swinging movement, an arm 144 (Fig. 15), which hooks upwardly to engage one arm 145 of the bell crank lever 137. It will thus be seen that while the rack bar 100 is traveling forward with its rack 104 in driving engagement with the barrel gear 103, the totalizer carriage will be locked against traveling movement, and the master wheel 101 will be unlocked to permit a rotation of the same.

When a numeral key 35 has completed its valuating or indexing movement, the rack bar 100 would have completed its driving movement forward, so that during the remainder of the down stroke of the numeral key, the rack bar 100 can be removed from engagement with the pinion 103, to permit an idle return movement of the rack bar 100. Inasmuch as the movement of the universal frame 48 which controls the escapement mechanism of the carriage, takes place toward the end of the key stroke, this action is utilized to control the disconnection of the rack bar 100 from engagement with the pinion 103 which it drives, as by this time the computing action will have been completed.

To do this, the swinging frame 49 for the universal frame 48 is provided with a downwardly extending arm 146, which is bifurcated to loosely engage a pin 147 on one arm 148 of a bell crank lever 149, the other arm 150 of which is connected to a link 151. The link 151 is connected to swing an arm 152 on a rock shaft 153, to which is also secured an arm 154. The arm 154 has a pin 155 which engages in a slot or play-way 156 provided in the rack bar 100. A second slot 157 is provided, which is engaged by a pin 158 on a double bell crank 159, one arm 160 of which is connected by a link 161, to an offset 162 of the arm 154. It will thus be seen that this provides a parallel motion, whereby when the shaft 153 is rocked at the backward movement of the universal frame 48, at the end of a key stroke, the rack bar 100 will be moved bodily downward, in a horizontal position, out of mesh with the gear 103.

As the rack teeth 104 come out of mesh with the gear 103, it is desirable to lock the latter against rotation, so that the rack and gear will readily mesh again on an upward movement of the rack bar 100. For this purpose, the double bell crank 159 has a locking arm 163 provided with a dog 164 adapted to swing down in between two of the teeth on the gear 103 as the bell crank 159 rocks to swing the rack bar 100 out of mesh with the gear 103. As the actuated numeral key 35 is returned by its spring 165, the rack bar 103 will return to its normal position indicated at Fig. 7.

In order that the rack bar 100 may return the full distance, there is provided a full-stroke mechanism including a rack 166 on the bar 100, having ratchet teeth facing their abrupt sides to the left (in Fig. 16) to be engaged by a spring-pressed pawl 167, which will permit movements of the rack bar 100 to the right but will prevent movements to the left. Normally, when the rack bar 100 is in its raised position, it is free and clear of the pawl 167, so as not to be interfered with thereby, but when in its depressed position, it comes into engagement with the pawl 167, which latter forms with the rack 166, a full-stroke mechanism. The full-stroke mechanism would not be complete, however, if the rack 100 could move to its upper position before it finished its stroke. To avoid such premature movement, a pin 168, which pivotally connects the link 161 with the arm 160 of the double bell crank 159, has an extension 169 (Figs. 7, 8 and 17), which is cut away to form a sharp corner 170.

When the parallel linkage is in its fully depressed position corresponding to the complete disengagement of the rack bar 100 from the pinion 103, and with the rack 166 and the pawl 167 in coöperative relation, then a latch 171 brings its notch 172 into engagement with the corner 170, locking the parallel linkage from return motion until the latch 171 is released. The latch 171 is secured to a shaft 172ª, on which is secured an arm 173 pressed by a spring 174, so as to normally tend to bring the latch 171 into its effective position. When, however, the driving rack bar 100 comes to its home position (Fig. 7), arm 98 connected thereto by link 99 engages an adjustable stop screw 175 on the arm 173, and rocks the arm, together with the latch 171, against the tension of the spring 174, to the ineffective position of the latch 171. It will thus be seen that as the driving rack bar 100 completes its return movement it releases the latch 171, and thus permits a return movement of the parallel linkage together with the rack bar 100 so that the latter will be in a position to mesh once more with the gear 103. The upward movement of the parallel linkage, and thus of the driving rack bar 100, is limited accurately by an adjustable set screw 176, which engages a projection or toe 177 provided on the link 161.

It is desirable to prevent too rapid action of the numeral keys either of the same one or different ones, so that a computing action initiated by one numeral key may be completed before it or any other numeral key can be actuated. For this purpose, each of the numeral keys 35 is provided with a pendent link 178 (Figs. 21 to 24), each of which extends down in a guiding slot 179 in a common bar 180. The links 178 are provided with downwardly-facing ratchet teeth 181 to be engaged by the associated one of a series of spring-pressed pawls 182 loosely mounted on a common shaft 183. Normally the pawls 182 are free and clear of the links 178, so that the numeral keys 35 can be depressed freely. When, however, one numeral key has been depressed to effect a computation, then the pawls 182 are brought to their effective position by the shaft 183, so as to prevent the depression of the same or any other numeral key until the computing action started has been completed.

The shaft 183 rocks the pawls 182 indirectly so as to permit them to yield, and thus admit of the upward movement of the link on the previously depressed numeral key, as in Fig. 21. To provide for this, each of the pawls 182 is loosely mounted on the shaft 183, but is provided with a collar 184, which has a one-half-moon sector 185 coöperating with a similar half-moon section 186 on a collar 187 secured to the shaft 183. There is a certain amount of play between the two collars 184 and 187, which is taken up by a spring 188, which urges the pawl 182 to its work, and yet yields sufficiently to permit the upward movement of the link, as in Fig. 21. One end of the spring 188 may be secured to a collar 189 fixed on the shaft 183, the other end of the spring engaging the back of the associated pawl 182.

In order to operate the shaft 183, and thus bring the pawls 182 to their working position at the proper instant, there is provided on the shaft 183, an arm 190, which is connected by a link 191 to an arm 192 secured on the shaft 153. It will be remembered that the shaft 153 is rocked from the universal frame 48 toward the end of the numeral-key stroke, which occurs after the computing action has been completed.

It is thus evident that the series of pawls 182 will come into action as each numeral key finishes its stroke and after it has completed its computing action, so that the numeral key if allowed to rise partially, cannot be again depressed; nor can the same or another numeral key be depressed until the particular numeral key in action has been raised its full amount. One of the reasons for this is the fact that the latch 171 prevents a return action of the linkages, and thus a return rocking of the shaft 153 until the driving rack bar 100 has returned to its normal position, when the latch 171 is released.

The dependent links 178 are also used to prevent the depression of more than one numeral key at the same time. For this purpose, they are each provided with a rearward extension 193 (Figs. 21 to 24 and 28), which acts as an intruder and forces itself between a pair of hinges 194, 195, which are pivotally mounted at their upper ends and provided with abutting extensions 196 and 197. The hinges 194, 195 are closely arranged, so that they abut together in a series, and the extent of their movement is limited on both sides by pins 198, 199 (Figs. 5, 6 and 28), to an amount corresponding to the thickness of solely one of the extensions 193. It thus happens that if one of these intruding extensions is forced between a pair of the hinges, there will be no more room for any other extension, and, hence, no other key can be depressed while one is already depressed. It would also prevent the simultaneous depression of two keys, inasmuch as there is not room enough for two of the extensions to crowd between two pairs of the hinges 194 and 195 at the same time.

The crowding lock just described is also used to prevent the actuation of any numeral key at a punctuation space, so that where it may be desired to space off thousands from hundreds by a comma, or where it is desired to space off dollars from cents by a decimal point, no numeral key can be struck to tend to cause an actuation. For this purpose, there are provided on the totalizer carriage, pins 200 (Figs. 7, 13, and 28), which pins are located with respect to the dial wheels 116 in correspondence with the spaces between hundreds and thousands, and between dollars and cents. The tens of cents dial wheel 201 (Fig. 13) and the hundreds of dollars dial wheel 202 may be extra wide to allow for the writing of the comma and decimal point between them and the next higher dial wheel.

The pins 200 as the totalizer travels along in correspondence with the step-by-step movement of the typewriter carriage, come into engagement with a cam point 203 of a trigger lever 204 at the time when a comma or decimal point should be written on the work-sheet. The trigger lever 204 will thus be rocked against the tension of a spring 205, so as to draw on a link 206, which in turn will rock a lever 207, so as to intrude an arm 208 thereon between the end hinges 195 (Fig. 28) and the limiting pin 199. The arm 208 is of sufficient magnitude to crowd all of the hinges 194, 195 together, so as to prevent the intrusion of any of the links 178, and thus prevent the depression of any of the numeral keys 35. The particular character key 36 which writes a comma or a period, can be actuated at this time, when the totalizer carriage will advance, releasing the lever 204 so that its spring 205 may remove the crowding arm 208 from between the end hinge 195 and the pin 199, thus permitting the actuation of one of the numeral keys 35 for the next letter space, to run a digit into the proper dial wheel. The computing wheels 114 corresponding to the wide dial wheels 201 and 202, are made of corresponding widths so as to properly co-operate therewith.

As each dial wheel completes a rotation, it is necessary to carry "1" to, or borrow "1" from, the next dial wheel as the case may be. For this purpose there is provided a carry-over mechanism. Loosely mounted on the same shaft 109 as the master wheel, there are provided a series of carry-over wheels 209 (Figs. 5 and 13). These carry-over wheels are of corresponding width to the dial wheels, and are staggered with respect to the computing wheels 114, so that when the totalizer is at rest during a computing operation, the gaps between the computing wheels 114 will be bridged by the carry-over wheels 209, as shown in Fig. 13.

It will be noted that the majority of the teeth on the computing wheels 114 occupy but a fraction of the width of each computing wheel, so that they are of sufficient width to drive the dial wheels 115, but not of sufficient width to lap two of the carry-over wheels 209. Once in each revolution of each computing wheel, however, an elongated tooth 210 will come into engagement with the carry-over wheels 209, and this tooth is of sufficient transverse magnitude to engage the carry-over wheel 209 which engages all of the teeth of the next higher computing wheel 114. It is thus evident that when a computing wheel 114 completes a revolution corresponding to the coming of "0" on the dial wheel 115 to the sight opening 117, then the next higher computing wheel will be locked for rotation therewith so as to carry "1" to the next higher computing wheel. This is true for either direction of rotation of the computing and dial wheels, so that tens-carrying and borrowing can be effected for addition and subtraction. Where the dial wheels are extra wide for the punctuation spaces, the carry-over teeth 210 are extra wide so as to bridge an intermediate idle carry-over wheel 209, and engage the next higher carry-over wheel which overlaps the next higher computing wheel.

Inasmuch as there is a relative movement between the carry-over wheels 209 which are stationary, and the computing wheels 114 which travel with the totalizer, it is essential that the computing wheels 114 always remain in proper justification, so that each thereof will mesh and engage properly with the teeth of the carry-over wheels 209. To aid in doing this, the frame which supports the totalizer-actuating mechanism including the carry-over wheels, is provided with a pair of wings 211 and 212 (Fig. 5), having justifying edges 213, 214 which come right up to the side of the highest carry-over wheel on the one hand, and the master wheel on the other hand.

It will be seen by this arrangement, that as soon as any computing wheel of the totalizer passes from engagement with the highest carry-over wheel on the one hand, or with the master wheel on the other hand, it will be engaged by the justifying and locking edges 213, 214, and held against accidental rotation, so that when it once more comes into register with either the master wheel or the carry-over wheels, it will be in proper condition to mesh therewith.

The carry-over wheels 209 are locked against accidental rotation by detents 215, one for each carry-over wheel, and provided with noses 216 arranged to engage between the block teeth of the carry-over wheels 209. To hold each detent strongly to its work, so as even to justify after a carry-over operation, there is provided a universal bail 217 which engages offsets or arms 218 provided on the detents 215. The bail 217 is urged to its work by rather a strong spring 219 (Fig. 12), which is powerful enough to justify any of the carry-over wheels 209.

When a carry-over operation is taking place, however, with one of the wheels 209, the bail 217 will be raised from a position resting on the detent 215, so that the silent carry-over wheels might be subject to accidental movement were it not for the provision of additional restraining means for the detents. This latter restraining means, however, is arranged to be quite weak, so that in a series carry-over, very little burden of work would be placed on the driving mechanism. For this purpose, each of the detents 215 is provided with a rearwardly extending finger 220 (Fig. 11), having a cam face 221 engageable by a cam face 222 of one arm of a lever 223. There is one of these levers 223 for each of the detents 215, and the other arm thereof is engaged by a plunger 224 urged into action by a spring 225.

It will thus be seen that the universal bail 217 with its spring, is strong enough to justify any of the carry-over wheels, and when not effective on all the detents 215, these detents are lightly held against accidental movement by the spring-actuated plungers 224, whereby the carry-over wheels will be justified properly without an excessive burden being placed thereon, as might be the case if each individual detent spring were strong enough to justify its carry-over wheel.

Further provision is made to lock the carry-over wheels against accidental movement when the totalizer is in a computing zone except when a carry-over operation is necessary. For this purpose, there are provided a plurality of locks 226, shown in the form of levers pivoted at 227, and having beveled followers 228 to ride readily over beveled backs 229 provided on the detents 215. This enables a relative movement between the detents 215 and the locks 226 which are carried by the shaft 227 of the totalizer, without danger of an obstructing action.

Normally each of the locks 226 is held with its lower end engaging snugly with the detent 215 in engagement therewith, by a tooth 230 thereon engaging the periphery of the corresponding computing wheel 114. When, however, the associated dial wheel 115 passes from the Fig. 8 position to the Fig. 7 position, to bring its "0" to the sight opening 117, then at a point partway of that motion, a socket 231 (Fig. 30) will come into register with the tooth 230, as in Fig. 11, permitting the lock 226 to rock at this time, which is the time when the broad tooth 210 causes a rotation of the next higher computing wheel, through the intermediary of one of the carry-over wheels 209. It will thus be seen that at the time of carryover only does the lock 226 permit a releasing movement of the detent 215 with which it happens to be in engagement at the instant. To prevent excessive vibration, the locks 226 may be limited in their movement by a universal guard rail 232.

The operation of the device will be readily understood when taken in connection with the above description. If it is desired to use the typewriting mechanism without computing, the bichrome-shift-key lever 70, 71 is adjusted to its neutral position (Fig. 20), when the machine will print black without computing, as the master wheel will be disconnected from the key-driven valuating mechanism. If it is desired to add, the lever is adjusted to the Fig. 19 position, while if subtraction is desired, the lever is adjusted to the Fig. 5 position.

After the machine has been adjusted for the type of computation desired, the typewriter carriage 41 is advanced to a computing zone, which may be varied by varying the position of the totalizer through its connecting latch 121. The numeral keys are then struck, and the indexing or valuating mechanism will translate the fixed movements of the numeral keys into various movements of the oscillator 78 according to the values of the numeral keys actuated. It will be noted that each of the cam slots 75 has a dwell portion at its end, so that the numeral keys have a certain amount of passive movement as to computing action, during the initial portion of their down stroke.

The various movements of the oscillator 78, if the machine is set for writing lower-case characters with the numeral keys, will be transmitted through the linkage connections to the driving rack 100. This driving rack is normally in the position shown in Fig. 7, but as the oscillator 78 starts to rock the arm 98, the pitman or link 99 will start to advance the same forwardly. During the initial part of this movement of the rack 100, the turned-down end of the arm 141 will be cammed out of the socket 140 on to the level in back of the same so as to rock the arm 141 and the arm 144, causing the latter in turn to rock the bell crank lever 145, which it will be remembered, forms a double lock, the parts of which are alternative in their actions. The rocking of the bell crank lever 149 withdraws the locking tooth 139 from the master wheel 101, releasing the same for rotation, at the same time forcing the dog 138 into the rack 135 on the totalizer, preventing a relative movement between the master wheel and the computing wheel during the rotation of the master wheel. The forward movement of the rack bar 100 drives the barrel pinion 103, and the latter drives the master wheel 101 either forwardly or backwardly, or not at all, according to the adjustment of the double bell crank key lever 70, 71, and thus according to the position of the gear 103 and the gear 106 relative to the alternative train of gearing to the master wheel shaft 109. The master wheel 101 when rotated, drives whichever computing wheel it happens to be in register with, an amount corresponding to the particular numeral key actuated.

The driving rack 100 will complete its forward movement, even for the numeral key "9," before the latter has completed its downward movement, by virtue of the peculiar form of the cam slot 75. Hence, at the end of the stroke of a numeral key, as the heel 51 on the type bar forces the universal frame 48 backwardly, the computing operation will have been completed, so that this rearward motion of the universal frame can be used to depress the driving rack bar 100 out of engagement with the pinion 103. This is done, as explained above, through the linkages including the parts 146 to 161. This action it will be remembered, moves the driving rack bar 100 in a perfectly horizontal position, then carries it completely clear of the gear 103, and brings the full-stroke rack 166 into the reach of the pawl 167. This depression of the rack 100 will permit the counter-rocking of the bell crank 145, so that the totalizer carriage will be unlocked free to travel, and the master wheel will be locked against accidental rotation. The latch 171 will lock the driving rack 100 in its depressed position until it has completely returned, when the latch will be tripped by engagement of the arm 140 with the set screws 175 connected to the latch 171, and the rack bar 100 will once more come to its elevated position with the return of the universal frame 48 to its initial position. It is evident then that the totalizer will be unlocked and the master wheel locked, so that as the carriage 41 advances to the next letter space, the totalizer 83 may move with it without danger of any error.

At the end of the forward stroke and before the return stroke, the key locking mechanism, including the pawls 182 and the shaft 183, is brought into play through the same parts which depressed the rack 100 to its non-driving position, so that the same or another numeral key could not be actuated until the rack had completely returned to its home position, and the parts all assumed a condition ready for a subsequent computing action.

Carry-over operations between computing wheels will be taken care of by the carry-over wheels 209, and these wheels will be permitted to rotate within a computing zone only when needed to effect a carry-over operation. They will be justified after action by the detents 215 under the operation of the bail 217 with its strong spring. A light detention of the carry-over wheels is taken care of by the lightly pressed plungers 24.

If the numeral keys are used to print with upper-case characters other than the numeral keys, then the platen frame is shifted for upper-case writing, which action will interrupt the connection between the oscillator 78 and the linkage which connects it to operate the driving rack 100.

Variations may be resorted to within the scope of the invention, and portions of the improvements may be used without others.

Having thus described my invention, I claim:

1. The combination with a totalizer, of numeral keys for controlling computing operations carried on by said totalizer, typewriting mechanism controlled by said numeral keys, and including a case-shift to enable the writing of upper and lower-case characters by said numeral keys, a master wheel for said totalizer, connections including a single universal shaft between said numeral keys and said master wheel whereby each numeral key positively drives said master wheel by its depression, and case-shift-operated means for interrupting said connections at said shaft.

2. The combination with a totalizer, of numeral keys for controlling computing operations of said totalizer, a master wheel for said totalizer, connections between said numeral keys and said master wheel whereby each numeral key positively drives said master wheel by its depression, including an indexing universal shaft, a case-shift mechanism for enabling the printing of either one of two sets of characters under the control of said numeral keys, and a case-shift-operated means for breaking connection between said numeral keys and said totalizer at said shaft.

3. The combination with a totalizer, of a series of numeral keys, a master wheel for operating said totalizer, connections between said master wheel and said numeral keys whereby each numeral key positively drives said master wheel by its depression, said connections including an indexing mechanism having a shaft universal to said keys and adjacent thereto, and moving variable amounts according to the key actuated, said connections also including driving and controlling parts between said shaft and said master wheel, a case-shift mechanism for enabling alternative printing with either one of two sets of characters under the domination of said numeral keys, and case-shift-operated means for interrupting the connection between said universal shaft and said master wheel at said shaft.

4. The combination with a series of numeral key levers, of a series of graded cams fast on said key levers differentially formed according to the values of said key levers, a rock bar universal to said cams and actuable thereby variable amounts according to the values of said key levers, a totalizer, a master wheel therefor, an actuator for said master wheel, including a reciprocating bar, a rock shaft to which said rock bar is fast, and an interruptible connection at said rock shaft for connecting it to said reciprocating bar.

5. The combination with a series of numeral key levers, of a series of diffentially formed cams fast on said key levers, a bail universal to said cams and actuable thereby different amounts to correspond with the values of the numeral key levers, a totalizer, a master wheel therefor, a reciprocating bar connected to operate said master wheel, a frame adapted to rock with said bail and connected to said bar to operate it, and a pivoted lever forming part of said frame shiftable to cause said bail to positively reciprocate said bar or to disconnect said bar from said bail.

6. The combination with a totalizer, of numeral keys, an oscillator, differential connections enabling the actuation of said oscillator from said keys various amounts, said oscillator including a shaft, an arm fixed to said shaft to rock therewith, a pin on said arm, an interponent straddling said pin, a lever pivoted on said shaft and pivotally connected to said interponent, said interponent being movable from engagement with said pin so as to interrupt the connection between said oscillator and said lever, and connections from said lever to said totalizer.

7. The combination with numeral keys, of an oscillator, differential connections between said numeral keys and said oscillator, a lever to be actuated by said oscillator, a pin on said oscillator, and an interponent movable between positions of engagement and disengagement of said pin to control the effectiveness of the connection between said lever and said oscillator.

8. The combination with a series of numeral keys, of an oscillator, driving connections between said numeral keys and said oscillator, a lever to be operated by said oscillator, and an interponent movably connected to said lever and detachably connected to said oscillator to determine the effectiveness of said oscillator to drive said lever.

9. The combination with a series of numeral keys, of an oscillator, driving connections between said numeral keys and said oscillator, a lever to be operated by said oscillator, an interponent movably connected to said lever and detachably connected to said oscillator to determine the effectiveness of said oscillator to drive said lever, a spring normally holding said interponent in rigid connection with said oscillator, and means for disengaging said interponent from said oscillator.

10. The combination with a series of numeral keys, of an oscillator, driving connections between said numeral keys and said oscillator, a lever to be operated by said oscillator, an interponent movably connected to said lever and detachably connected to said oscillator to determine the effectiveness of said oscillator to drive said lever, a spring normally holding said interponent in rigid connection with said oscillator, and means for disengaging said interponent from said oscillator, said lever having a stop to limit the disengaging movement of said interponent and to limit the movement of said means.

11. The combination with typewriter numeral keys, of an oscillator controlled in its movements by said numeral keys, a totalizer, a master wheel for operating said totalizer, types, independent of the oscillator, operated by said keys, connections between said oscillator and said master wheel including a frame, and a shiftable member forming part of said frame settable to make said frame rigid with said oscillator or not, at will.

12. The combination with a platen, of a case-shift mechanism for said platen, numeral keys for effecting concomitant typewriting and computing operations, a totalizer dominated by said numeral keys, an oscillator, driving connections enabling the movement of said oscillator under the control of said numeral keys to drive said totalizer, an interponent forming a connecting link between said connections and said oscillator, and a bell crank operated from said case-shift mechanism for detaching said interponent from said oscillator.

13. The combination with typewriter numeral keys, of a traveling typewriter carriage, computing mechanism including a master wheel and computing wheels having a relative movement brought about by said carriage, cams fast to said numeral keys, a bail rockable by said cams, a reciprocating rack bar for driving said master wheel and positively connected thereto until its digitizing stroke is completed, a rocking frame adapted to be connected to or disconnected from said bail, and a link extending from said frame and connected to positively make said bail and said rack bar move together.

14. The combination with a totalizer, of numeral keys, and a key-driven indexing mechanism operated during the initial portion of the down stroke of each numeral key and terminated near the end of the down stroke of the numeral key, a normally ineffective means to prevent key-return to depressed position, and means for making said preventing means effective near the end of the down stroke of any key.

15. The combination with a series of numeral keys, of type actions operated by said numeral keys and arranged to print during the last portion of the down stroke of said numeral keys, indexing or valuating mechanism effective to perform a computing action during the initial portion of the down stroke of said numeral keys and finishing somewhat short of the end of the down stroke of each numeral key, so that said numeral keys will be idle with respect to a computing action while said type actions are actually printing, a normally ineffective means for preventing key-return to depressed position, and means for making said key-preventing means effective by the time the computing action is complete.

16. The combination with a series of numeral keys, of type actions operated by said numeral keys to print at the end of the down stroke of said numeral keys, indexing mechanism operated by said numeral keys and having a dwell portion giving an idle action at the latter part of the down stroke of said numeral keys during the printing by said type actions, a normally ineffective means for preventing key-return to depressed position, and means for making said key-preventing means effective by the time the computing action is complete.

17. The combination with a totalizer, of a master wheel for driving said totalizer, a train of gearing to drive said master wheel, a sliding rack meshing with said gearing on its effective movement and radially out of mesh therewith on its ineffective movement, shifting means between said rack and said wheel to rotate said master wheel either forwardly or backwardly, keys for driving said rack and positively moving it out of mesh, and a normally ineffective means for preventing key-return to depressed position, effective when said rack is so out of mesh.

18. The combination with a totalizer, of a master wheel for driving said totalizer, a train of gearing to drive said master wheel, a reciprocating rack bar for driving said train of gearing, a pitman for oscillating said rack bar, a crank for oscillating said pitman, numeral keys connected to operate said crank, and numeral key-operated means for positively moving said rack bar radially out of mesh with said gearing for the return reciprocation thereof.

19. The combination with a master wheel device, of a rack bar for driving said master wheel device, a lock for said master wheel device, and a bell crank operated from said rack for shifting said lock.

20. The combination with a master wheel device, of a rack bar for driving said master wheel device, said rack bar having a depression therein, a lock for said master wheel device, and a bell crank having an arm engaging in said depression and operative at the movement of said rack bar to release said lock.

21. The combination with a totalizer having computing wheels, of a master wheel for driving said computing wheels *seriatim*, said master wheel and said totalizer having a relative movement to effect the *seriatim* engagement of the master wheel with the computing wheels of said totalizer, a lock for preventing relative movement between said totalizer and said master wheel, a rack bar connected to drive said master wheel, and a bell crank directly contacting with said rack bar to bring into play said lock at the initial movement of said rack bar.

22. The combination with a totalizer having computing wheels, of a master wheel for driving said computing wheels *seriatim*, said totalizer and said master wheel having a relative movement to effect a *seriatim* engagement of said master wheel with said computing wheels, a duplex lock arranged to alternatively lock said master wheel against rotation and prevent relative traveling movement between said totalizer and said master wheel, a rack bar connected to drive said master wheel and having a cam surface thereon, and a bell crank having an arm engaging said cam surface and arranged to concomitantly release the lock for the master wheel and render effective the lock for preventing relative movement, at the initial driving movement of said rack bar.

23. The combination with a computing unit including a totalizer, of a master wheel device for driving said totalizer, locking means for said computing unit, a driving rack bar for said master wheel device, and a bell crank for operating said locking means, said rack bar having a cam surface to rock said bell crank.

24. The combination with a computing unit including a totalizer, of a master wheel for driving said totalizer, locking means for said master wheel, a driving rack bar for said master wheel, a gear connected to said master wheel, a bell crank for operating said locking means, said rack bar having a cam surface to rock said bell crank, and shifting means for moving said rack bar clear of said gear, so that it will be ineffective to drive said master wheel, the connections between the rack bar, bell crank and locking means being such that the shifting of said bell crank renders said locking means effective to prevent rotation of said master wheel.

25. The combination with computing wheels, of a master wheel, a master-wheel drive including a pinion, a slidable rack bar adapted to drive said master wheel differential amounts by engagement with said pinion, linkages forming a parallel motion device for shifting said rack bar bodily radially to and from said pinion, and a connection operated by said linkages atuomatically locking said pinion when said rack bar is disconnected therefrom.

26. In a combined typewriting and computing machine, the combination with computing wheels, of a traveling carriage, a master wheel caused to engage said computing wheels *seriatim* by said carriage, a master-wheel drive including a pinion, a slidable rack bar adapted to drive said master wheel by engagement with said pinion, linkages forming a parallel motion device for moving said rack bar radially to and from said pinion, a connection from said linkages for automatically locking said pinion whenever said rack bar is out of mesh therewith, and a connection operated by said rack bar when moving said master wheel for locking said carriage against said movement.

27. The combination with a computing wheel, of a train of gearing to drive said computing wheel, a rack bar to drive said train of gearing and having one or more slots therein, a pair of bell cranks having pins extending into said slots to permit a relative movement between said bell cranks and said rack bar, a link connecting said bell cranks to move in unison, and means for operating said bell cranks to move said rack bar always in one and the same plane and to maintain parallel to all of its positions.

28. The combination with a computing wheel, of a train of gearing to drive said computing wheel, a rack bar to drive said train of gearing, a pitman to drive said rack bar, a bell crank to drive said pitman, a pair of bell cranks connected to shift said rack bar bodily, a link connecting said bell cranks so that they will move in unison, and means for operating said bell cranks to move said rack bar always in the same plane to enable the engagement and disengagement of said rack bar with said train of gearing.

29. The combination with a totalizer having computing wheels, of a master wheel to rotate said computing wheels, a driver to rotate said master wheel, numeral keys for driving said driver, a traveling carriage, an escapement mechanism for said carriage under the control of said numeral keys, and shifting means operated from said escapement mechanism for rendering said driver active and inactive on the master wheel.

30. The combination with a series of computing wheels, of a master wheel to rotate said computing wheels, a universal driver to turn said master wheel, a traveling carriage, an escapement mechanism for said traveling carriage, a series of numeral keys for driving said driver and operating said escapement mechanism, and means controlled from said escapement mechanism, at the final portion of the down stroke of each numeral key, for bodily moving said driver to effective and ineffective positions relative to the master wheel.

31. The combination with a series of computing wheels, of a master wheel to rotate said computing wheels, a universal driver to turn said master wheel, numeral keys for driving said driver, type-actions operated by said numeral keys, a carriage coöperating with said type-actions to print the numbers as computed, a universal frame controlling movements of said carriage, and connections from said universal frame to said driver to enable the disconnection of said driver from the master wheel.

32. The combination with a series of computing wheels, of a driver connectible to rotate said computing wheels, numeral keys connected to actuate said driver, a traveling carriage, a universal frame operated at the actuation of each of said numeral keys for controlling the movements of said traveling carriage, and a linkage operated from said universal frame and connected to move said driver to an inoperative position at the end of a numeral-key stroke.

33. The combination with a series of computing wheels, of a driver connectible to rotate said computing wheels, numeral keys positively connected at the actuation of said driver to move the same both on its active and inactive strokes, a normally ineffective means for preventing key-return to depressed position, and means whereby said preventing means is made effective before said inactive stroke.

34. The combination with a totalizer, of a rack bar for driving said totalizer, a series of numeral keys, a positively actuated indexing mechanism interposed between said rack bar and said keys, whereby any one of said keys will drive said rack bar back and forth, first on an effective and then on an ineffective stroke, a normally ineffective means for preventing key-return to depressed position, and means whereby said key-preventing means is made effective on the effective stroke.

35. The combination with a series of computing wheels, of a driver connectible to rotate said computing wheels, numeral keys positively connected at the actuation of said driver to move the same both on its active and inactive strokes, means controlled from said keys for positively interrupting the driving connection from said driver to said computing wheels, a normally ineffective means for preventing key-return to depressed position, and means whereby said key-preventing means is made effective by said interruption.

36. The combination with a traveling carriage, of an escapement mechanism for said carriage, computing mechanism comprising a rack bar having first an effective stroke and then an ineffective stroke, numeral keys for controlling both said computing mechanism and said escapement mechanism, a normally ineffective key lock for said numeral keys, and means for making said key lock effective by starting said rack bar on its ineffective motion.

37. The combination with a traveling carriage, of means for controlling traveling movements of said carriage, computing mechanism including a member having an effective stroke and an idle stroke, numeral keys for controlling said computing mechanism and said travel-controlling means, and normally ineffective locking means for preventing key actions, made effective when said travel-controlling means becomes effective and made ineffective when said computing mechanism restores said member to position for an active stroke.

38. In a combined typewriting and computing machine, the combination with typewriter numeral keys, of a typewriter carriage escapement, a universal frame for said escapement operated by said keys, normally ineffective key-return-preventing means for locking said keys against a second actuation after an incomplete return stroke, and connections whereby said key-preventing means is made effective by said universal frame.

39. The combination with a series of numeral keys, of links pendent from said numeral keys, each of said links having a rack thereon, a series of pawls, one for each link, and key-actuated means for bringing said series of pawls into play at the termination of the down stroke of a numeral key to enforce the return of such numeral key before the depression of another numeral key or the re-depression of the same numeral key.

40. The combination with a series of numeral keys, of pendent links on said numeral keys having racks thereon, a frame universal to said numeral keys and actuated indirectly thereby, a shaft, a series of pawls on said shaft, and connections for rocking said shaft from said universal frame at the termination of the down stroke of a numeral key to bring said pawls into coöperation with the racks on said links to prevent depression of other keys.

41. The combination with a series of numeral keys, of links pendent from said numeral keys having racks thereon, a series of pawls, one for each of said numeral keys, a shaft common to said pawls, spring means for carrying said pawls yieldingly with said shaft, and tripping means for rocking said shaft to bring said pawls into yielding engagement with said racks to prevent action of said keys.

42. The combination with a series of numeral keys, of links pendent from said numeral keys having racks thereon, a pawl for each of said racks, a shaft common to all said pawls, said pawls having a limited amount of play relative to said shaft, a spring for taking up said play, and means for rocking said shaft at the end of the down stroke of said keys, to bring said pawls into coöperation with said racks.

43. The combination with a traveling carriage, of a universal frame for said carriage, a series of numeral keys, type actions controlled by said numeral keys and engaging said universal frame to operate the same, links pendent from said numeral keys having racks thereon, pawls to engage said racks, a shaft common to said pawls and yieldingly operating the same, and linkages extending from said universal frame to said shaft to enable said shaft to be rocked at the actuation of said universal frame by one of said keys, so as to bring said pawls into coöperation with said racks to prevent actuation of said numeral keys.

44. The combination with numeral keys, of links connected to said numeral keys having racks thereon, pawls normally out of engagement with said racks, and shifting means for bringing said pawls into engagement with said racks at the end of the down stroke of any of said keys to prevent a second down stroke of any of said keys until an up stroke is completed.

45. The combination with a series of numeral keys, of normally ineffective locking means for said numeral keys actuable when effective to prevent depression of said numeral keys, shifting means for bringing said locking means into play near the termination of the down stroke of any of said numeral keys, and latching means for maintaining said locking means in play during part of the up stroke of the actuated numeral key.

46. In a combined typewriting and computing machine, the combination with typewriter numeral keys and a bichrome ribbon device, of printing devices therefor, a computing device including a master wheel, a driver for said master wheel operated by said keys, an addition-subtraction device controlled by said bichrome ribbon device, and a single member connected to said bichrome ribbon device for concomitantly silencing said driver and locking said numeral keys.

47. The combination with a series of computing wheels, of a driver connectible to said computing wheels to rotate the same, a series of numeral keys controlling said driver, and a single means for concomitantly disconnecting said driver from said computing wheels and locking said keys against actuation while said driver is disconnected from said computing wheels.

48. The combination with a series of computing wheels, of a driver connectible to drive said computing wheels, having an active stroke and an inactive stroke, numeral keys, connections from said keys for driving said driver, and locking means independent of said connections and controlled by the driver for preventing the depression of said numeral keys during the inactive stroke of said driver.

49. In a computing machine, the combination with numeral keys, of computing wheels, a master wheel for operating said computing wheels, means forming a master wheel drive for positively connecting said numeral keys to said master wheel during part of the down stroke of the keys, separate means for preventing the simultaneous depression of two numeral keys, and normally ineffective means connected to said master wheel drive for preventing a second depression of a numeral key after it has risen incompletely from a first depression.

50. The combination with a series of computing wheels, of a driver for said computing wheels, numeral keys for giving said driver an effective stroke and an ineffective return stroke, locking means for said numeral keys ineffective on the effective stroke of the driver, and means for bringing said locking means into play and disconnecting said driver from said computing wheels during the period of an ineffective stroke of said driver.

51. The combination with a master wheel drive, including a pinion, of numeral keys, a slidable rack bar operated by said keys, connections whereby said keys positively operate said rack bar in one direction in the upper part of the down stroke, and in the opposite direction in the upper part of the return stroke, means whereby the rack bar is moved clear of the pinion in the lower part of the down stroke and is latched clear thereof, a full-stroke device for said rack bar effective only when said rack bar is disconnected from the pinion, and means whereby the completely operated key restores said rack bar to mesh with the pinion and frees it from the full-stroke device.

52. The combination with a traveling typewriter carriage and typewriter numeral keys, of an escapement for said carriage controlled by said keys, two primary computing elements, a totalizer and a master wheel, said primary elements having a relative movement, locking means for preventing such relative movement, a computing device controlled by said escapement, means whereby the computing device when effective makes said locking means effective, and connections whereby the escapement when actuated to permit a traveling movement of said carriage renders said locking means ineffective.

53. The combination with dial wheels having block teeth so that digits may be inscribed on the peripheral faces of the teeth, of computing wheels having thin and narrow teeth and spaces between the teeth adequate to accommodate the block teeth of said dial wheels, carry-over wheels having block teeth, each carry-over wheel meshing with the adjacent computing wheel, but normally out of mesh with its own computing wheel, a broad tooth on each computing wheel to mesh with its carry-over wheel to effect a carry-over on the adjacent dial wheel, and a master wheel having block teeth to engage and drive said computing wheels *seriatim*.

54. The combination with dial wheels having block teeth so that digits may be inscribed on the peripheral faces of the teeth, of computing wheels having thin and narrow teeth and spaces between the teeth adequate to accommodate the block teeth of said dial wheels, a master wheel having block teeth to engage and drive said computing wheels *seriatim*, and block-toothed carry-over wheels coaxial with said master wheel and arranged to engage said computing wheels above said master wheel, said dial and computing wheels having an identical travel relative to said carry-over and master wheels.

55. The combination with a series of computing wheels, comprising narrow wheels and also wide wheels to cover punctuation spaces, of a traveling carriage for said computing wheels, a master wheel adapted to engage said computing wheels step by step, including an extra step with the wide computing wheels, pins on said carriage registering with the widened portions of the wide wheels, a series of numeral keys adapted to drive said master wheel, a series of pendent links, key levers to which said pendent links are directly pivoted, a series of dogs adapted to be jammed together by any one of said pendent links to prevent the actuation of any other numeral key while a pendent link is between the dogs, a trigger lever operated by said pins, a pivoted locking lever mounted adjacent said dogs, and means actuated by the trigger lever for swinging the end of the locking lever between the dogs to lock all of the numeral keys against actuation.

56. In a combined typewriting and computing machine having typewriter numeral keys adjacent the bottom thereof and a computing mechanism including a master wheel near the top thereof, of a reciprocating member for operating said master wheel and adjacent thereto, a reciprocating frame adjacent said keys, means including a link for connecting said frame and said reciprocating member, and cams fixed to said keys for differentially operating said frame.

57. In a combined typewriting and computing machine, the combination of a typewriter carriage and an escapement mechanism therefor including a universal bar, typewriter numeral keys, a master wheel adapted to be driven by said keys, and means whereby said escapement mechanism disconnects said keys from said master wheel and locks said keys against a second actuation.

58. In a combined typewriting and computing machine, the combination with a master wheel and a typewriter escapement, of means for driving said master wheel intermittently connected thereto, and a connection between said driving means and said escapement preventing complete operation of said escapement while said driving means is disconnected from said master wheel.

59. In a combined typewriting and computing machine, the combination with a master wheel device and computing wheels, of a reciprocating rack bar for operating said master wheel device, an extension of said rack bar forming a cam surface having a notch adjacent said surface, a lock for said computing mechanism, and a follower for operating said lock normally resting in said notch and making said lock effective when the follower rides out of the cam surface.

60. The combination with computing wheels, of a master wheel device, a slidable rack bar adapted to drive said master wheel device differential amounts, linkages forming a parallel motion device for shifting said rack bar bodily radially to and from said master wheel device, a connection operated by said linkages automatically locking said master wheel device when said rack bar is disconnected therefrom, and means for holding said rack bar clear of said master wheel device until it arrives at its home position in its motion clear of said master wheel device.

61. The combination with computing wheels, of a master wheel device, a slidable rack bar adapted to drive said master wheel device differential amounts, a pivoted actuating arm connected to said rack bar, linkages forming a parallel motion device for shifting said rack bar bodily radially to and from said master wheel device, a connection operated by said linkages automatically locking said master wheel device when said rack bar is disconnected therefrom, means for holding said rack bar clear of said master wheel device until it arrives at its home position in its motion clear of said master wheel device, said means including a latch effective on said linkages, and a releasing arm adapted to be struck by said pivoted actuating arm at the end of the rearward stroke of the rack bar.

62. The combination with computing wheels, of a master wheel device, a slidable rack bar adapted to drive said master wheel device differential amounts, linkages forming a parallel motion device for shifting said rack bar bodily radially to and from said master wheel device, a connection operated by said linkages automatically locking said master wheel device when said rack bar is disconnected therefrom, means for holding said rack bar clear of said master wheel device until it arrives at its home position in its motion clear of said master wheel device, and a full-stroke device for preventing retrograde motion of said rack bar while free of the master wheel device.

63. In a computing machine, the combination with computing wheels and a master wheel, of a carriage for causing relative travel between them, a rack bar intermittently connected to said master wheel to drive it, an interlock between the driving means for the master wheel and the carriage, and an interlock between said rack bar and said master wheel.

64. The combination of a totalizer, a master wheel therefor, numeral keys, typewriter mechanism controlled by said numeral keys and including a case shift, a master-wheel drive, a key-actuated link for actuating said master wheel drive, connections between said link and said keys pivoted to said link, and including a single device universal to said keys whereby each key by its depression positively actuates said link, and case shift-operated means for interrupting said connections.

65. The combination of a totalizer, a master wheel therefor, numeral keys, typewriter mechanism controlled by said numeral keys and including a case shift, a master-wheel drive, a key-actuated link for actuating said master-wheel drive, a link-actuating device positively connected to said link and universal to said keys, differential key-actuated devices for giving graded movements to said link-actuating device corresponding to the keys depressed, and case-shift-operated means for interrupting the connection between said link and said link-actuating device.

66. The combination with a series of numeral keys, of a device universal to said keys, key-actuated means to move said universal device different amounts to correspond with the values of the numeral keys, a totalizer, a master wheel therefor, a reciprocating bar connected to operate said master wheel, a movable frame connected to said bar to operate the same, and a pivoted lever forming part of said frame shiftable to connect said universal device and said frame to positively reciprocate said bar or to disconnect said frame from said universal device.

67. The combination with a totalizer, of numeral keys, an oscillator, differential connections enabling the actuation of said oscillator from said keys various amounts, said oscillator including a shaft and an arm fixed to said shaft to rock therewith, a lever pivoted on said shaft, connections from said lever to said totalizer, and a connecting device to move said lever with said oscillator, said connecting device including means whereby the connection between said oscillator and said lever may be broken.

68. The combination with numeral keys, of an oscillator, differential connections between said numeral keys and said oscillator, a lever to be actuated by said oscillator, and a driving connection between said oscillator and said lever, said driving connection including means whereby the effectiveness of said driving connection may be controlled.

69. The combination with a series of numeral keys, of an oscillator, driving connections between said numeral keys and said oscillator, a lever to be operated by said oscillator, and an interponent detachably connecting said lever and said oscillator to determine the effectiveness of said oscillator to drive said lever.

70. The combination with a series of numeral keys, of an oscillator, driving connections between said numeral keys and said oscillator, a lever to be operated by said oscillator, an interponent detachably connecting said lever and said oscillator to determine the effectiveness of said oscillator to drive said lever, a spring for normally holding said interponent to give rigid connection between said oscillator and said lever, and means to move said interponent to break the connection between said oscillator and said lever.

71. The combination with a series of numeral keys, of an oscillator, driving connections between said numeral keys and said oscillator, a lever to be operated by said oscillator, an interponent detachably connecting said lever and said oscillator to determine the effectiveness of said oscillator to drive said lever, a spring normally holding said interponent in position to rigidly connect said lever and said oscillator, means for moving said interponent to break the connection between said oscillator and said lever, and means to limit the movement of the interponent in breaking said connection.

72. The combination with a platen, of a case-shift mechanism for said platen, numeral keys for effecting concomitant typewriting and computing operations, a totalizer dominated by said numeral keys, an oscillator, driving connections enabling the movement of said oscillator under the control of said numeral keys to drive said totalizer, a device interposed between said connections and said oscillator to enable actuation of said connections by said oscillator, said device including disabling means whereby it may be made ineffective, and means operated from said case-shift mechanism for rendering said device ineffective.

73. The combination with typewriter numeral keys, of a traveling typewriter carriage, computing mechanism including a master wheel and computing wheels having a relative movement brought about by said carriage, a key-operated device, a reciprocating rack bar for driving said master wheel and positively connected thereto until its digitizing stroke is completed, a rocking frame adapted to be connected to or disconnected from said key-operated device, and a link extending from said frame and connected to positively make said key-operated device and said rack bar move together.

74. The combination with typewriter numeral keys, of computing wheels, a master wheel, means for causing a relative movement between said master wheel and said computing wheels, a key-actuated device universal to said keys, a master-wheel drive including a reciprocating bar positively connected to said master wheel until its digitizing stroke is completed, a rocking frame connected to said reciprocating bar, and detachable connections between said rocking frame and said universal device.

75. The combination with a master wheel, of a master-wheel drive including a reciprocating bar, a lock for said master wheel, and means operated from said reciprocating bar for shifting said lock.

76. The combination with a master wheel, of a master-wheel drive including a reciprocating bar, said reciprocating bar having a cam thereon, a lock for said master wheel, and a lever supported so as to have one end thereof engaged by said cam upon movement of said reciprocating bar to release said lock.

77. The combination with a totalizer having computing wheels, of a master wheel for driving said computing wheels *seriatim*, said master wheel and said totalizer having a relative movement to effect the *seriatim* engagement of the master wheel with the computing wheels of said totalizer, a lock for preventing relative movement between said totalizer and said master wheel, masterwheel-driving means including a reciprocating bar, and a bell crank directly contacting with said reciprocating bar to bring into play said lock at the initial movement of said reciprocating bar.

78. The combination with a totalizer having computing wheels, of a master wheel for driving said computing wheels *seriatim*, said totalizer and said master wheel having a relative movement to effect a *seriatim* engagement of said master wheel with said computing wheels, a duplex lock arranged to alternatively lock said master wheel against rotation and prevent relative traveling movement between said totalizer and said master wheel, a master-wheel drive including a reciprocating bar having a cam surface thereon, and a bell crank having an arm engaging said cam surface and arranged to concomitantly release the lock for the master wheel and render effective the lock for preventing relative movement at the initial driving movement of said reciprocating bar.

79. The combination with a master wheel, of a master-wheel drive including a pinion, a driving rack bar for said pinion, means for giving said rack bar an operative stroke in raised position and an inoperative stroke in depressed position, and a lock for said master wheel including a bell-crank lever controlled by engagement with said rack bar for locking said master wheel when said rack bar is depressed.

80. The combination with computing wheels, of a master mechanism including a pinion, a reciprocable rack bar for driving said pinion, a parallel motion device for shifting said rack bar bodily to and from said pinion, and locking means for said pinion thrown into operation by said parallel motion device when the rack bar is disconnected from said pinion.

81. The combination with a master wheel, of a master-wheel drive including a pinion, a reciprocating rack bar for driving said pinion, means for moving said rack bar bodily to and from said pinion, and master-wheel-locking means made effective by the bodily movement of said rack bar from said pinion.

82. The combination with a master wheel, of a master-wheel drive including a pinion, a reciprocating rack bar for driving said pinion, means for moving said rack bar bodily to and from said pinion, and master-wheel-locking means and pinion-locking means both made effective by the bodily movement of said rack bar from said pinion.

83. The combination with a master wheel, of a master-wheel drive including a pinion, a reciprocating rack bar for driving said pinion, means for moving said rack bar bodily to and from said pinion in a plane perpendicular to the axis of rotation of said master wheel, and master-wheel-locking means made effective by the bodily movement of said rack bar from said pinion.

84. The combination with a series of computing wheels, of a traveling carriage, a master wheel, means controlled by said carriage whereby the master wheel is caused to engage said computing wheels *seriatim*, a master-wheel drive including a pinion, a reciprocable rack bar adapted to drive said master wheel by engagement with said pinion, a parallel motion device for moving said rack bar to and from said pinion, pinion-locking means made effective by movement of the rack bar out of mesh with said pinion, and means controlled by the rack bar to lock said carriage against movement when said rack bar is driving said pinion, and to lock said master wheel when the rack bar is ineffective to drive said pinion.

85. The combination with a series of computing wheels comprising narrow wheels and also wide wheels to cover punctuation spaces, of a traveling carriage, a master wheel, means controlled by the carriage to cause the master wheel to engage said computing wheels step by step, including an extra step with the wide computing wheels, pins on said carriage registering with the widened portions of the wide wheels, master-wheel-driving means including a series of numeral keys, and means actuated by said pins to prevent depression of any of said numeral keys when the master wheel is opposite the widened portion of one of said wide wheels.

86. The combination with a master wheel, of a master-wheel drive including a primary driving element, a reciprocating bar for actuating said primary driving element, coöperating devices on said primary driving element and said reciprocating bar to give driving connection therebetween, means to move said reciprocating bar bodily to and from said primary driving element to make and break the driving connection therebetween, and master-wheel-locking means made effective by the bodily movement of said reciprocating bar from said primary driving element.

87. The combination with a master wheel, of a master-wheel drive including a primary driving element, a reciprocating bar for actuating said primary driving element, coöperating devices on said primary driving element and said reciprocating bar to give driving connection therebetween, means to move said reciprocating bar bodily to and from said primary driving element in a plane perpendicular to the axis of rotation of said master wheel, to make and break the driving connection therebetween, and master-wheel-locking means normally tending to lock said master wheel and caused by engagement with the reciprocating bar in its driving stroke to release said master wheel.

88. The combination with a master wheel, of a master-wheel drive including a primary driving element and means for breaking and reversing the action of said drive, a reciprocating bar for actuating said primary driving element, coöperating devices on said primary driving element and said reciprocating bar to give driving connection therebetween, means to move said reciprocating bar to and from said primary driving element to make and break the driving connection therebetween, master-wheel-locking means, master-wheel-drive locking means, and connections between said reciprocating bar and each of said locking means, whereby upon withdrawal of said reciprocating bar from said primary driving element both of said locking means will be made effective.

89. The combination with a master wheel, of a master-wheel drive including a primary driving element, a reciprocating bar for actuating said primary driving element, coöperating devices on said primary driving element and said reciprocating bar to give driving connection therebetween, means to hold said reciprocating bar in coöperative relation to said primary driving element during movement in one direction, and to withdraw said reciprocating bar at the end of the active stroke, and means to prevent return of said reciprocating bar to position to coöperate with said primary driving element until said reciprocating bar has completed its return stroke.

90. The combination with a master wheel, of a master-wheel drive including a primary driving element, a reciprocating bar for actuating said primary driving element, coöperating devices on said primary driving element and said reciprocating bar to provide detachable driving connections therebetween, means tending to hold said reciprocating bar normally in operative position with respect to said primary driving element, means to cause bodily withdrawal of said reciprocating bar from said primary driving element at the end of its forward stroke, and means to prevent return of said reciprocating bar to operative position until the end of its return stroke.

91. The combination with a master wheel, of a master-wheel drive including a primary driving element, a reciprocating bar for actuating said primary driving element during a stroke in one direction, coöperating devices on said primary driving element and said reciprocating bar to provide detachable driving connections therebetween, a parallel motion device to give relative movement of said reciprocating bar and said primary driving element toward and from each other, means tending to hold the reciprocating bar in operative position relative to said primary driving element, and means to prevent the return of said reciprocating bar to operative position until the completion of its return stroke.

92. In a combined typewriting and computing machine, the combination with a typewriter escapement and a master-wheel device including a pinion, of a driving means for said master-wheel device including a reciprocating rack bar and controlling means to determine engagement and disengagement of said rack bar and said pinion, latching means rendered effective upon disengaging movement of said controlling means to prevent engagement of said rack bar and said pinion until said rack bar has reached the end of its return stroke, and a connection between said driving means and said escapement preventing complete operation of said escapement while said driving means is disconnected from said master-wheel device.

93. In a combined typewriting and computing machine, the combination with a typewriter escapement and a master-wheel device including a pinion, of a driving means for said master-wheel device including a reciprocating rack bar and controlling means to determine engagement and disengagement of said rack bar and said pinion, and latching means rendered effective upon disengaging movement of said controlling means to prevent engagement of said rack bar and said pinion until said rack bar has reached the end of its return stroke.

94. The combination with computing wheels, of a master wheel, means including a slidable rack bar for driving said master wheel differential amounts, an actuating arm linked to said rack bar, a parallel motion device for shifting said rack bar bodily to and from said master wheel, a connection operated by said parallel motion device automatically locking said master wheel when said rack bar is disconnected therefrom, means for holding said rack bar clear of said master wheel until it arrives in its home position in its motion clear of said master wheel, said means including a latch effective on said parallel motion device, a releasing arm, and means to trip said arm at the end of the rearward stroke of the rack bar.

95. In combination, computing mechanism, actuating means therefor including numeral keys, locking means to prevent depression of said keys, and key-actuated means inactive during the major part of the down-stroke of a numeral key, but effective in the lower part of said stroke to actuate said locking means to prevent a second depression of said key or a depression of any other numeral key until the completion of the up-stroke immediately following the original depression.

96. In combination, computing mechanism, printing mechanism, numeral keys, a key-actuated drive for both of said mechanisms constructed to cause the computation effected by the depression of a key to be completed before the printing of the numeral corresponding to said key, normally ineffective locking means to prevent depression of said keys, and means ineffective in the computing portion of the down-stroke, but effective during the remainder of the down-stroke to render said locking means effective to prevent a second depression of the key before the completion of the up-stroke subsequent to the original depression.

97. In a combined typewriting and computing machine, the combination with typewriter numeral keys and a pinion driven thereby to effect computations, of a reciprocating rack operated by said keys for driving said pinion, a typewriter escapement, a detent for arresting said pinion, and means whereby said detent is operated by said typewriter escapement.

98. In a combined typewriting and computing machine, the combination with typewriter numeral keys and a full-stroke pawl for each key effective only on up-strokes thereof, of a typewriter escapement mechanism, and means for actuating said full-stroke pawls by said escapement mechanism.

99. In a combined typewriting and computing machine, the combination with typewriter numeral keys and a pinion driven thereby to effect computations, of a reciprocating rack operated by said keys for driving said pinion, a typewriter escapement, a detent for arresting said pinion, means whereby said detent is operated by said typewriter escapement, and connections whereby said typewriter escapement moves said rack into and out of effective position.

HENRY L. PITMAN.

Witnesses:
W. O. WESTPHAL,
JOHN F. RULE.